United States Patent [19]

Koch

[11] Patent Number: 4,678,302
[45] Date of Patent: Jul. 7, 1987

[54] APPARATUS FOR HANDLING LIGHT-SENSITIVE PHOTOGRAPHIC SHEET MATERIAL IN AMBIENT LIGHT

[75] Inventor: Carl Koch, Stetten, Switzerland

[73] Assignee: Sinar AG Schaffhausen, Feuerthalen, Switzerland

[21] Appl. No.: 794,797

[22] Filed: Nov. 4, 1985

[30] Foreign Application Priority Data

Nov. 3, 1984 [CH] Switzerland .................. 5262/84

[51] Int. Cl.⁴ .................. G03B 17/24; G03B 19/10; B65H 3/46
[52] U.S. Cl. .................. 354/107; 354/174; 354/283; 271/165
[58] Field of Search .............. 354/105, 106, 107, 108, 354/109, 174, 276, 281, 283, 285, 182; 271/131, 133, 134, 135, 165; 414/129, 131

[56] References Cited

U.S. PATENT DOCUMENTS

| | | | |
|---|---|---|---|
| 4,153,365 | 5/1979 | English et al. | 354/108 |
| 4,206,989 | 6/1980 | Hahn et al. | 354/182 |
| 4,448,508 | 5/1984 | Bauer et al. | 354/285 |
| 4,592,634 | 6/1986 | Koch | 354/174 |

Primary Examiner—A. A. Mathews
Attorney, Agent, or Firm—Watson, Cole, Grindle & Watson

[57] ABSTRACT

The inventive apparatus is useful for, e.g., loading individual film sheets into cassettes for professional-style cameras, in daylight. A cassette (53) is insertable into the lower region of a housing (50). A separating device (55) is disposed above the cassette (53), which separating device has a cavity (90) for accommodating a stack of sheet film sheets. The top of the cavity (90) can be closed off by a light protection slide (91). A disk-shaped separating organ (112) is disposed above a lower light protection slide (116) of the separating device (55), which separating organ (112) is displaceable, e.g. by rotation. If one opens the lower light protection slide (116) of the separating device (55) in tandem with the light protection slide (57) of the cassette (53), the separating organ (112) separates out the bottommost film sheet of the stack, whereby the sheet falls into the cassette (53). After the light protection slides (116, 57) are closed, the now loaded cassette (53) can be removed. A container (51) with a light protection slide (70) is provided, for loading the stack of sheet film into the cavity (90) of the separating device (55) in daylight. This container (51) is insertable into the housing at a location above the separating device (55). If one opens the light protection slide (70) of the container (51) and the upper light protection slide (91) of the separating device (55) in tandem, the sheet film stack from the container (51) falls out of the container (51) and into the separating device (55).

29 Claims, 42 Drawing Figures

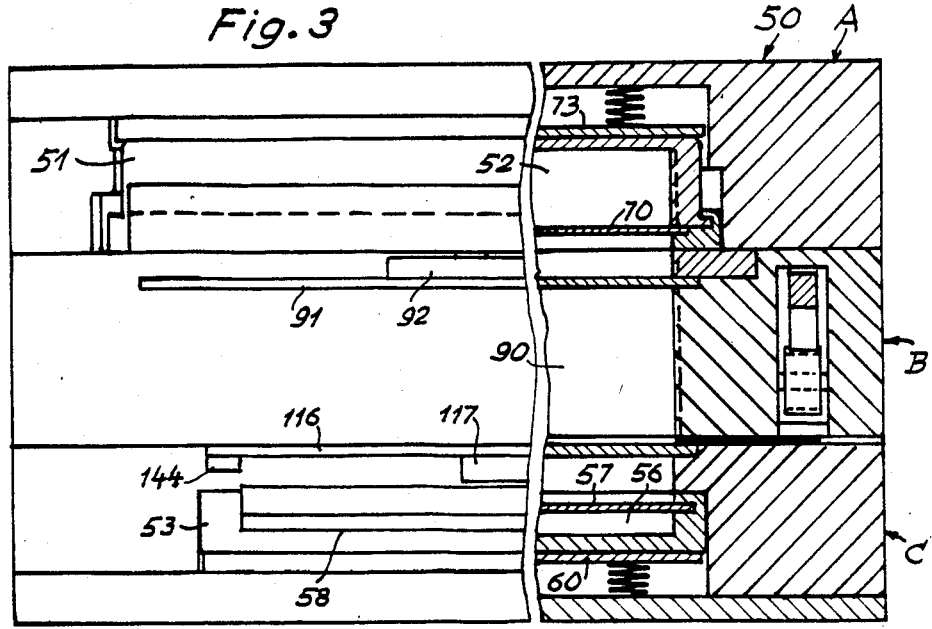
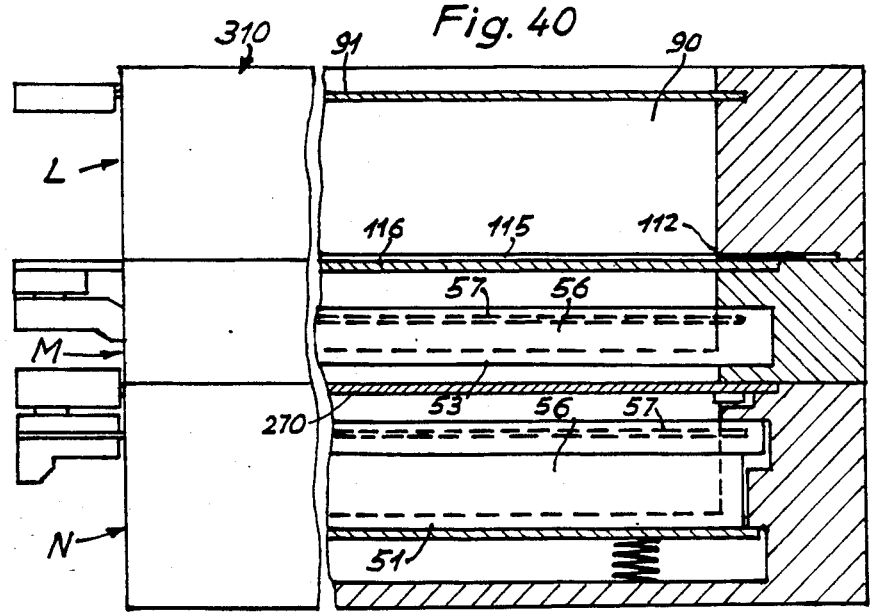

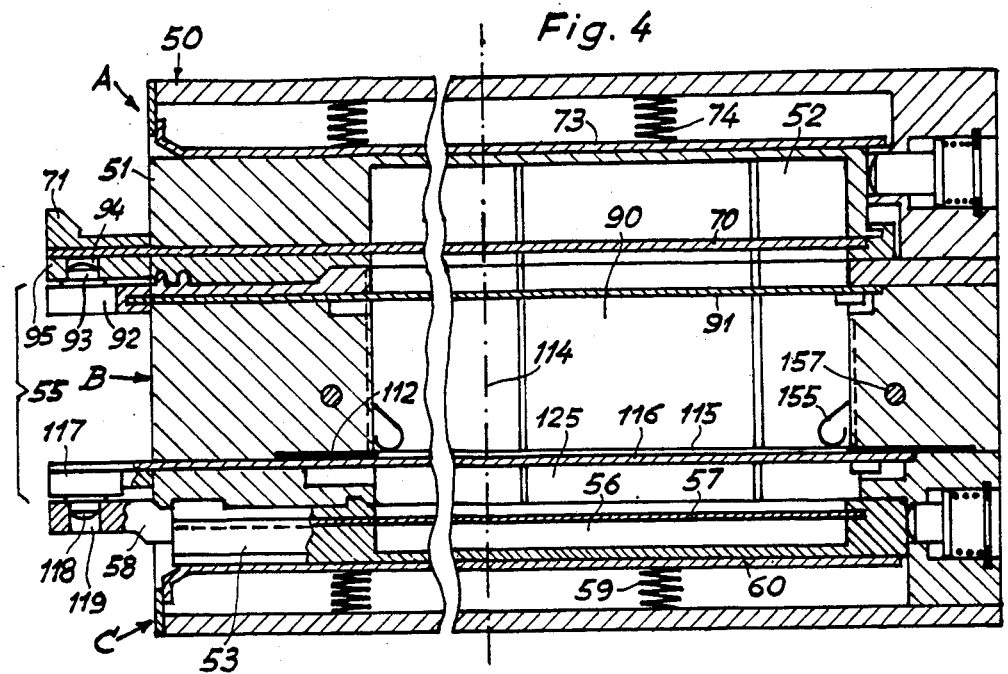
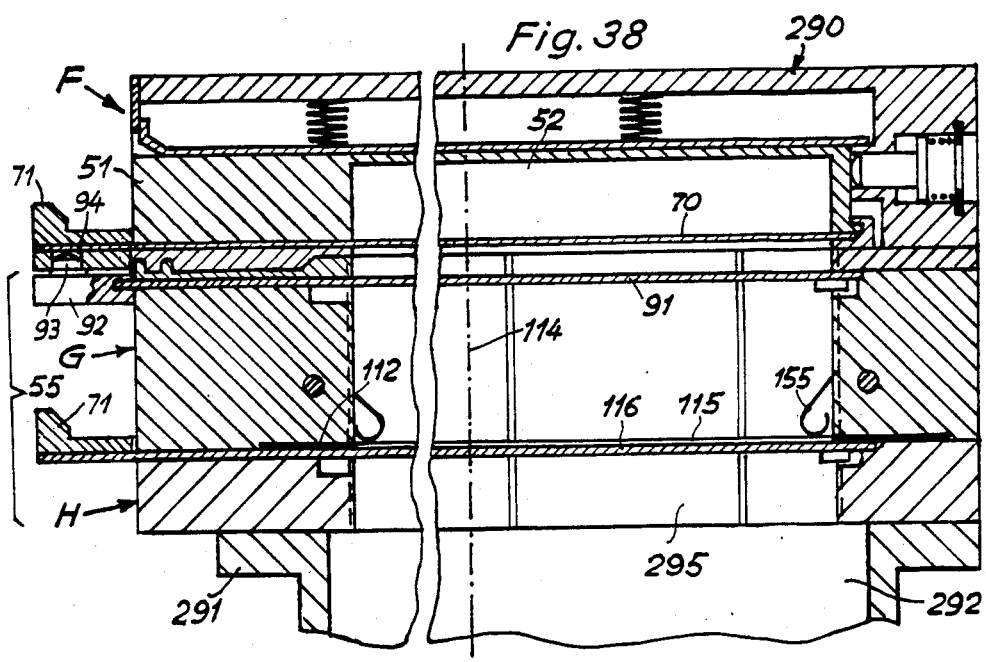

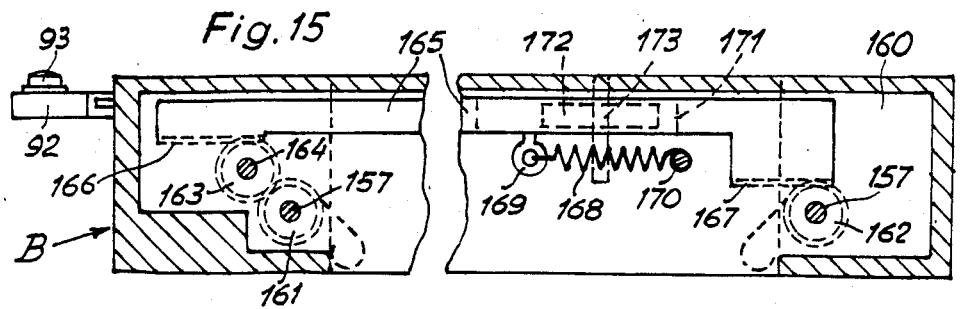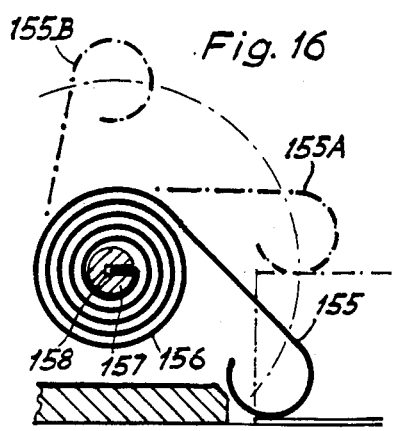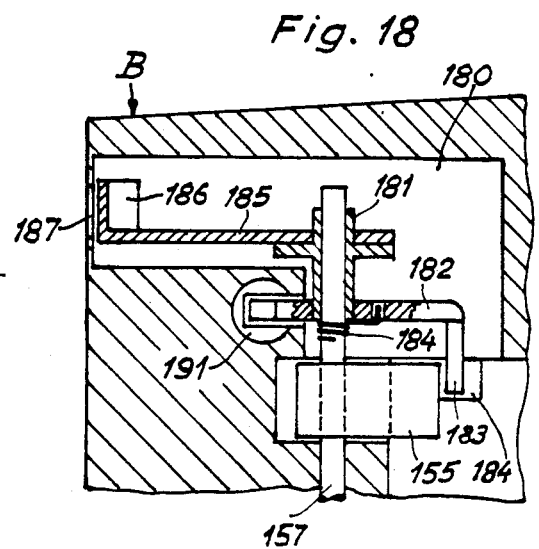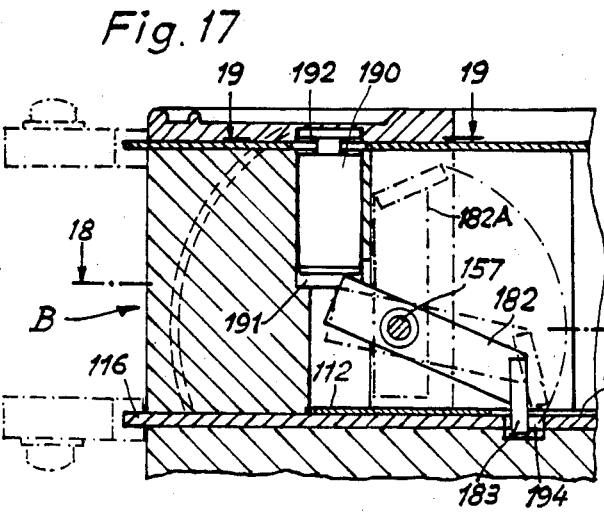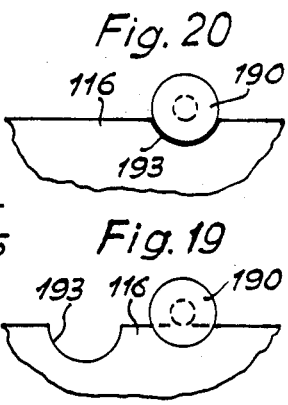

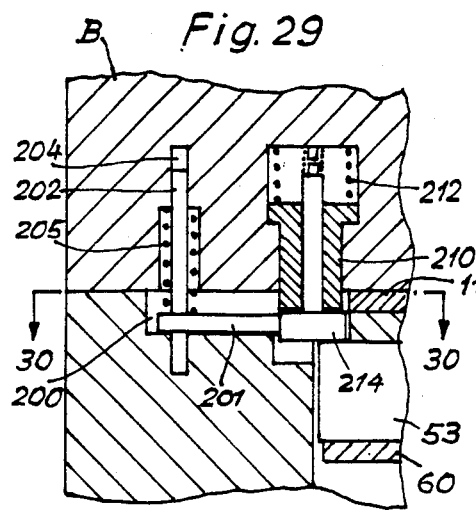
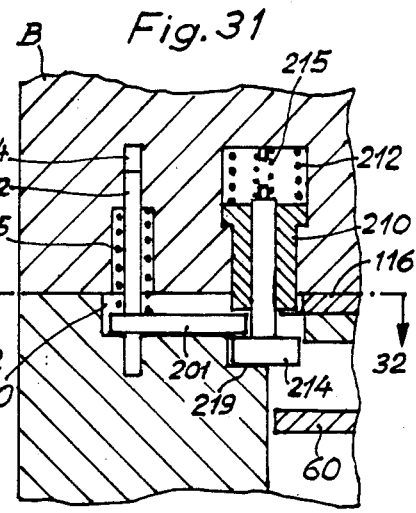
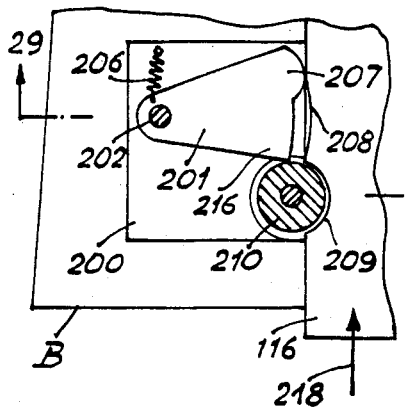
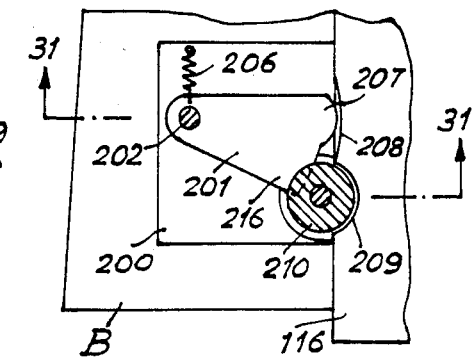
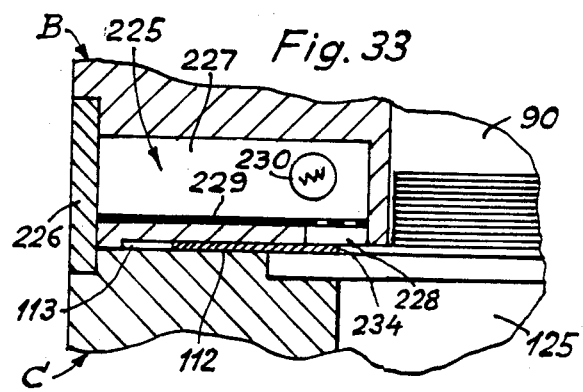

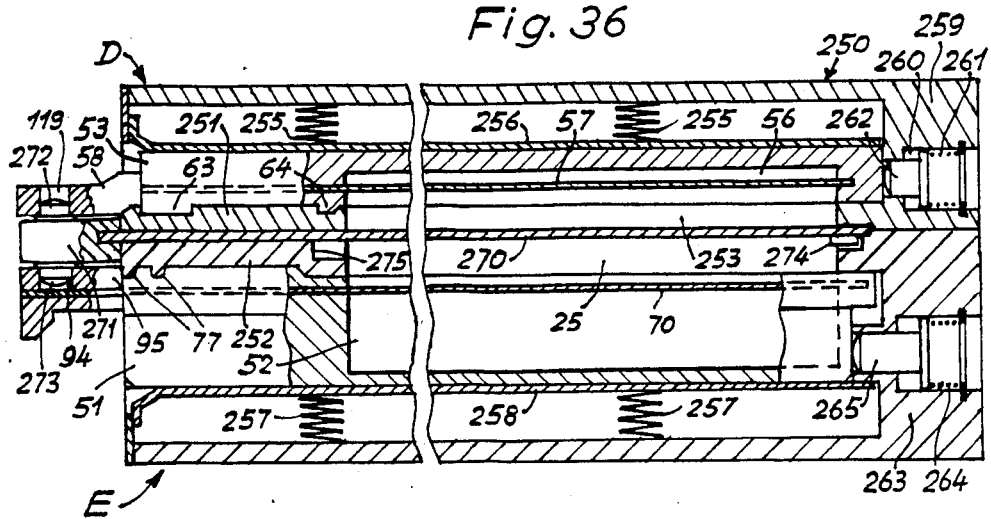
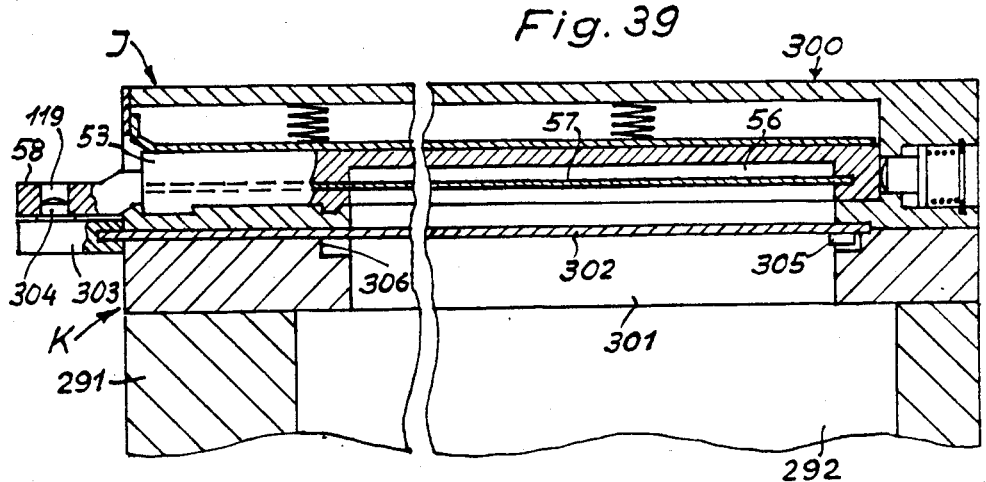

APPARATUS FOR HANDLING LIGHT-SENSITIVE PHOTOGRAPHIC SHEET MATERIAL IN AMBIENT LIGHT

The present invention relates to an apparatus which enables light-sensitive photographic sheet material to be handled in ambient light without risk of undesired light contact with the light-sensitive layers of the sheet material. The term "photographic sheet material" will be understood to mean individual sheets provided with a light-sensitive layer, e.g., negative or positive film sheets, cr copier paper sheets. The term "handling" refers in particular to inserting unexposed photographic sheets into cassettes designed to be applied to the back of a general purpose camera or a professional-style camera, and the term further refers to the removal of exposed photographic sheets from the cassettes and to the feeding of exposed photographic sheets to developing apparatus.

It is self-evident that undeveloped photographic sheets must be handled with complete exclusion of light in order to avoid harmful light contact. Such handling has been carried out heretofore generally manually in a darkroom, whereby there has been a possibility of erroneous or defective manipulations. In order to avoid these time-consuming and error-prone modes of operation in a darkroom, apparatuses have become known which permit some part of the aboveindicated handling to be carried out in ambient light. In particular there are known apparatuses with which it is possible to remove a single unexposed photographic sheet from a light-tight packaged stack of such sheets, and to insert the sheet into a cassette. Other manipulations are not possible with these known apparatuses.

SUMMARY OF THE INVENTION

The primary object of the present invention is to devise an apparatus for handling light-sensitive sheet material such that it has a compact construction and is more universally applicable and safer to operate than known apparatuses for the same purpose. Other objects of the invention will be evident from the detailed description of exemplary embodiments.

The point of departure for the invention is an apparatus with a separating device for separating an individual sheet from a stack of a plurality of sheets of the same shape and size, whereby such separation can be carried out in sequence for a plurality of sheets in the stack, and in each case the separated sheet can be transferred into a cassette designed for application to a photographic camera, or transferred to a feed inlet of a photographic developing apparatus, wherewith the separating device has an entrance opening for feeding sheet material and a delivery opening for delivering each individual sheet, and is provided with a movable separating organ disposed between the entrance opening and the delivery opening, and also is provided with connecting means, which connecting means allow the delivery opening of the separating device to be joined to the cassette or to a connecting piece on the feed inlet of the developing apparatus, the joining being releasable and being protected against ambient light. Such an apparatus according to the invention is basically characterized in that the separating device has an accumulation space for a stack of the sheet material, between the entrance opening and the separating organ; further in that the entrance opening of the separating device is provided with a closure organ which is movable into a closed position which closes off the entrance opening in light-tight fashion, and into an open position which completely exposes the entrance opening; further in that support surfaces for supporting the edge parts of the bottommost sheet of the stack are provided in the separating organ of the separating device; further in that the separating device comprises hold-down organs which extend into the accumulation space, for pressing the stack against the support shoulders; further in that each of the hold-down organs is movable from its pressing position into an inactive position in which it is disposed outside the accumulation space, in order to enable the stack to be inserted into the accumulation space; and in that drive means are provided to move the hold-down organs into their respective pressure positions and into their respective inactive positions, which drive means are controllable by the closure organ associated with the entrance opening of the separating device, such that the hold-down organs are each automatically brought into their inactive positions when the closure organ is moved into its open position, and when the closure organ is moved into its closed position the hold-down organs are automatically moved into their pressure positions.

Additional features of advantageous embodiments and refinements of invention will be evident from the description of exemplary embodiments following immediately hereafter, and from the associated drawings which illustrate a number of possible embodiments of the invention, such illustration being purely for the purposes of example.

DESCRIPTION OF THE DRAWINGS

FIG. 3 is an enlarged view of a vertical cross section the line 3—3 of FIG. 2;

FIG. 4 is an enlarged view of a longitudinal vertical cross section through the line 4—4 of FIG. 1;

FIG. 15 is a vertical longitudinal cross sectional view rough line 15—15 of FIG. 10;

FIG. 16 is an enlarged vertical partial cross sectional view through line 16—16 of FIG. 10;

FIG. 17 is an enlarged partial cross sectional view through line 17—17 of FIG. 10;

FIG. 18 is a horizontal cross sectional view through line 18—18 of FIG. 17;

FIGS. 19 and 20 are each horizontal partial cross sectional views through line 19—19 of FIG. 17, at various positions of the light protection slide;

FIGS. 27–32 are views analogous to FIGS. 25 and 26, for positions of the movable component parts;

FIG. 33 is a vertical partial cross section through line 33—33 of FIG. 10;

FIG. 36 is a longitudinal cross sectional view through line 36—36 of FIG. 35;

FIG. 38 is a longitudinal cross sectional view, analogous to that of FIG. 4, through an exemplary embodiment of the device, which embodiment is suitable for transferring the exposed film sheets which have been stacked in a container, this transfer being individual and in sequence, into a feed inlet of a photographic developing apparatus;

FIG. 39 is a longitudinal cross sectional view, analogue to that of FIG. 36, through a device which enables an exposed film sheet to be transferred directly from a cassette to the feed inlet of a photographic developing apparatus;

FIG. 40 illustrates an exemplary embodiment of a device which is set up to load cassettes with unexposed photographic sheet material and also to unload the cassettes and transfer the exposed film sheets taken from the cassettes into a container for stacking the film sheets;

DETAILED DESCRIPTION OF THE PREFERRED EMBODIMENT

Figure 1:
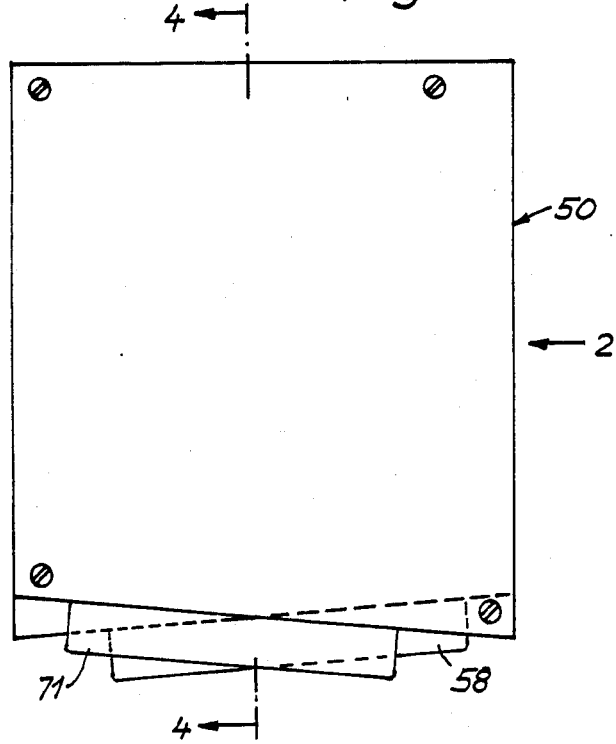
FIG. 1 is a plan view of a first exemplary embodiment of a device for loading unexposed sheet film into cassettes for a professional-type photographic camera.
Figure 2:
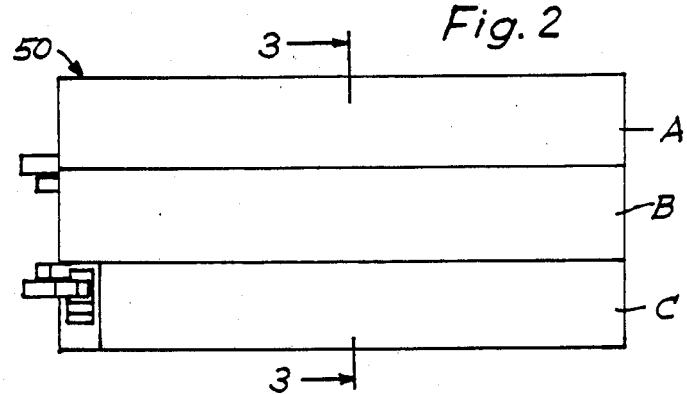
FIG. 2 shows a side view of the same device, in the direction of arrow 2 of FIG. 1.

FIGS. 1–33 illustrate one embodiment of the inventive device for handling light-sensitive photographic sheet material in ambient light. This embodiment comprises a housing 50 comprised of three levels A, B, and C which are stacked sandwich-style. The upper level A is intended to accommodate a container 51 (FIGS. 3–5, 8, and 9) which is provided with an opening 52 for accomodating a stack (not shown) of individual sheets of the photographic sheet material. The bottommost level C is intended to accommodate cassette 53 which may be in the form of an ordinary negative cassette for application to the back of a photographic camera of the general purpose or professional type. The container 51 and the cassette 53 can be slid into the housing 50 in the manner of a drawer. A separating device 55 is disposed between the container 51 and the cassete 53. This separating device will be described in more detail infra. Its purpose is to separate individual sheets from the above-mentioned stack of photographic sheet materials and to deliver them into the cassette 53.

Figure 7:
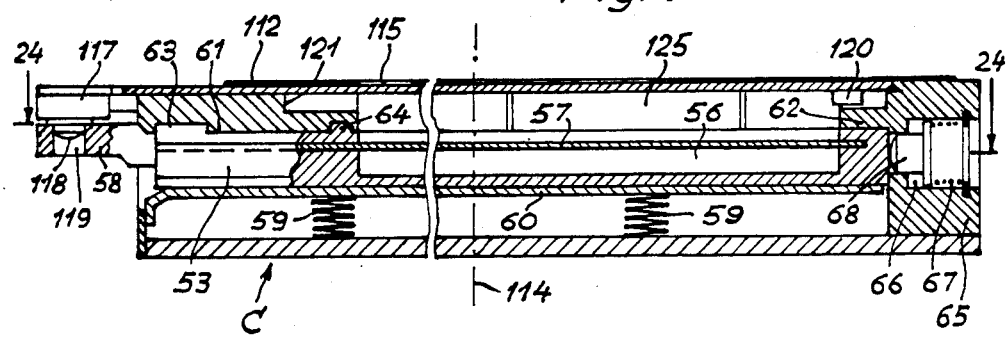

Cassette 53 has a cavity or recess 56 for accommodating a single sheet. The bottom surface of this cavity is adjusted to the shape and size of the lateral dimensions of the sheet. The open access opening or pass-through opening of cavity 5 is provided in customary fashion with a light protection slide 57, which slide is movable into a closed position, whereby the cavity 56 is closed off in light-tight fashion, and the slide is also movable into an open position which leaves the aforethis access opening completely exposed. The end parts of the light protection slide 57, which continually extend out beyond the cassette 53, comprise a gripping border 58 which facilitates manual manipulation of the light protection slide. A pressure plate 60 is disposed in the lowest level C of housing 50, which plate is acted on by springs 59 and in turn acts upon cassette 53 which has been slid into level C, such that cassette 53 is pressed upward against detent shoulders 61 and 62, wherewith protruding transverse ridges 63 and 64 of cassettte 53 come to engage corresponding grooves in the detent shoulder 61. A recess 66 is located in the rear wall region 65 of level C. A bumper 68 is slidably mounted in recess 66, which bumper is acted upon by a compression spring 67 and is pressed against the inner end of cassette 53. The action of the spring 67 and bumper 68 tends to push the cassette 53 for a slight distance out of the level C structure. However, such movement of cassette 53 to the left in FIG. 7 is prevented as long a the ridges 63 and 64 are engaged in the corresponding grooves of the detent shoulder 61.

The horizontal cross section of the cavity 52 of container 51 in level A of the housing 50 is adjusted in shape and size to the lateral measurements of the individual sheets of the stack of sheet material. The free opening or pass-through opening of cavity 52 is provided with a light protection slide 70, as is the case with cassette 53, which slide bears a gripping border 71 on its end which end continuously extends outside the container. This grip member facilitates manual manipulation of the light protection slide. In level A there is also disposed a pressure plate 73 which is acted upon by springs 74 and which thus tends to press the container 51 downward against detent shoulders 75 and 76 on level B of the housing. Container 51 has transverse grooves 77 which are engaged by corresponding ridges 78 on level B when container 51 is inserted in the housing 50 and is pressed downward by the pressure plate 73 via the springs 74. In the rear wall part of level A a bumper 80 is slidably mounted which bumper is acted upon by a compression spring 79 and which tends to force container 51 to slide such that it projects a slight distance out of level A. This sliding of container 51 is prevented, however, as long as the ridges 78 engage the corresponding grooves 77 of the container.

Figure 5:
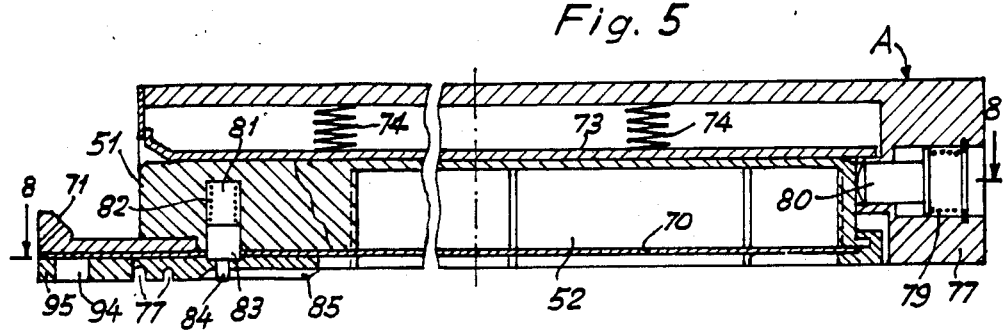
FIGS. 5-7 illustrate three levels, i.e., vertically joinable component modules of the device in a mutually separated state, corresponding to vertical longitudinal cross sections through line 5—5 of FIG. 8, line 6—6 of FIG. 10, and line 7—7 of FIG. 24, respectively.
Figure 8:
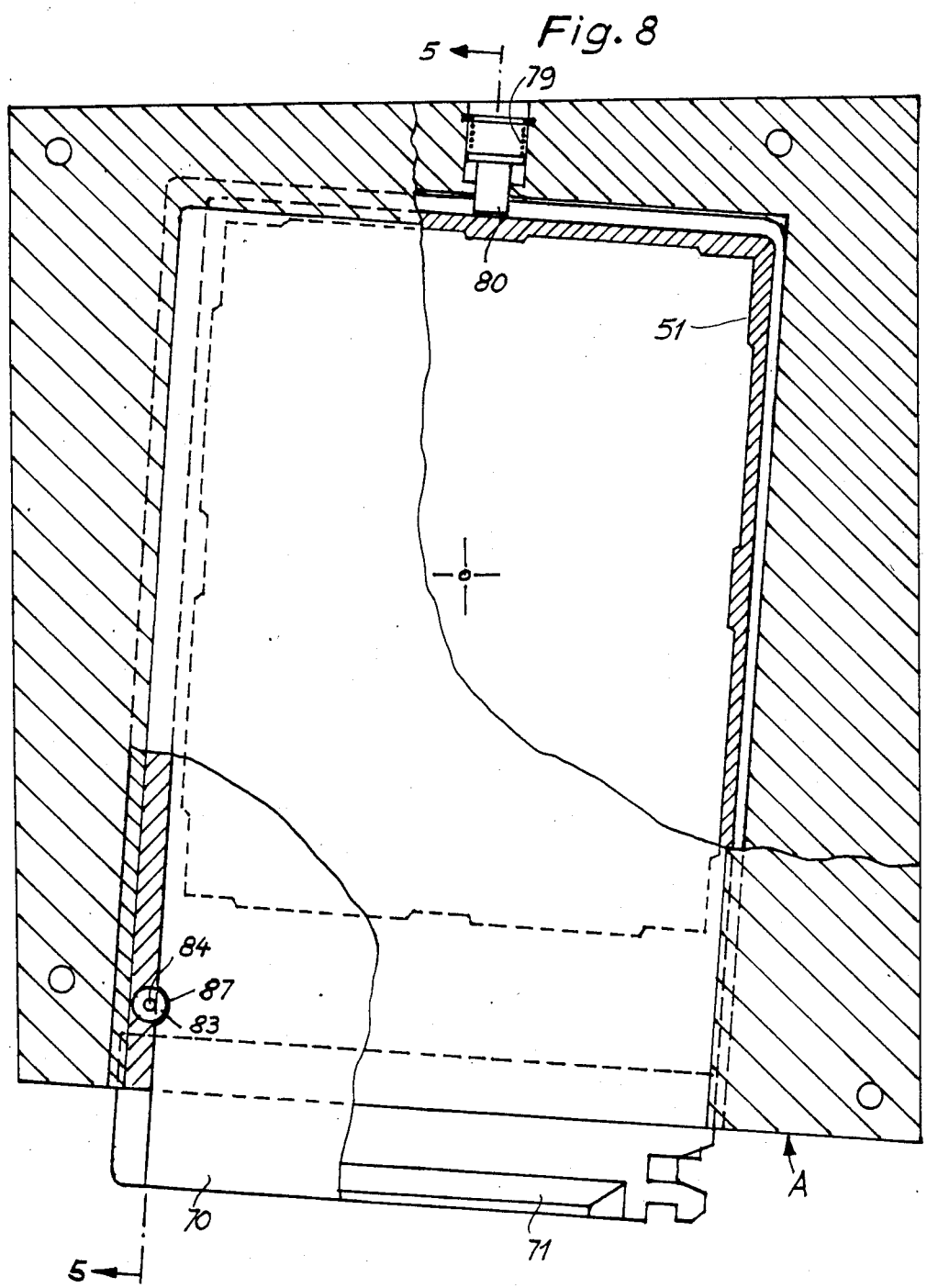
FIG. 8 is a horizontal cross sectional view through the line 8—8 in FIG. 5.
Figure 9:
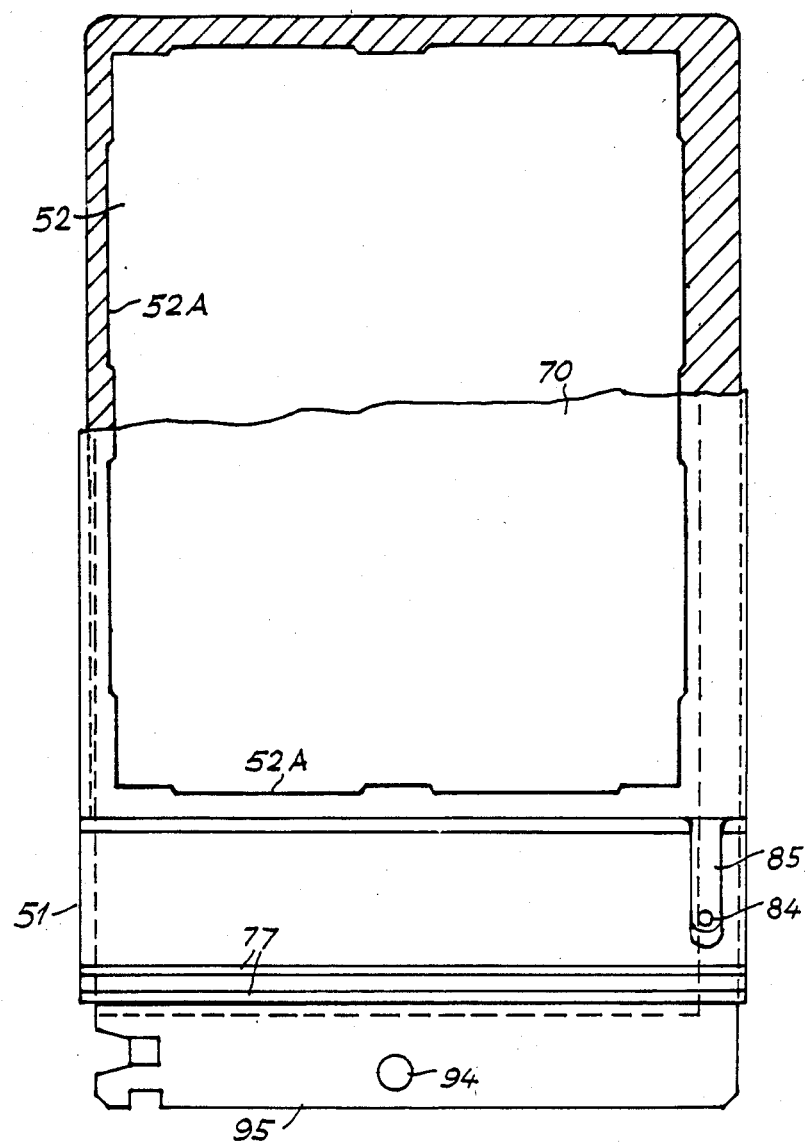
FIG. 9 is a bottom view of the container for receiving a stack of photographic sheet material, which container is inserted in the level A according to FIGS. 5 and 8.

According to FIGS. 5 and 8, the container 51 has a bore hole 81 outside of the cavity 52, in which bore hole a compression spring 82 and a piston 83 with a narrowed pin-shaped end part 84 are inserted. The action of the spring 82 tends to slide the piston 83 downward (FIG. 5) whereby the pin-shaped end part 84 extends down into a longitudinal groove 85 and is accessible from the exterior (FIGS. 5 and 9). A ridge 86 is disposed on the top side of level B, which ridge is brought into engagement with the longitudinal groove 85 of container 51 when the said container is inserted into level A of the housing 50. When this occurs, the pin-shaped end part 84 is pressed upward by means of ridge 86, whereby the piston 83 is moved a slight distance upward against the action of spring 82. Th piston 83 acts as a locking organ to keep the light protection slide 70 in its closed position as long a container 51 is not correctly inserted in housing 50. Toward this end, the light protection slide 70 (FIG. 8) has a notch 87 on one of its longitudinal edges, which notch has the shape of a circular segment, and the piston 83 is disposed such that part of it form-lockingly engages the notch 87 and thereby locks the light protection slide 70 in place if the piston 83 has not been pushed upward via the pin-shaped end part 84 (FIG. 5). When container 51 is correctly inserted into housing 50, ridge 86 of level B presses the piston 83 upward via the pin-shaped end part 84, to such an extent that this piston is moved above the level of the light protection slide 70 and is disengaged from the notch 87. Since the pin-shaped end part 84 is located outside the path of excursion of the light protection slide 70, as seen in FIG. 8, the end part 84 does not in any way interfere with the manipulation of the light protection slide.

The middle level B of housing 50 has a cavity 90 which runs through its entire height, the cross section of which cavity in the pass-through i.e., vertical direction is adjusted in its shape and size to the lateral dimensions of a single sheet of the photographic sheet material. When levels A and B are assembled together according to FIG. 4 and container 51 is correctly inserted in the housing 50, all four of the vertical boundary surfaces of the cavity 52 of the container and of the cavity 90 of level B are flush with each other, whereby the this cavities 52 and 90 adjoin each other mutually without any step configuration. Cavity 90 serves as an accumulation space for the separation device 55 (FIG. 4), which space provides room for a stack of sheet material which stack is at least as large as the stack accommodatable by cavity 52 of container 51. The upper free opening or entrance opening of cavity 90 is provided with a light protection slide 91 which is movable into a closed position and an open position, similarly to the abovementioned light protection slides 57 and 70. The end of light protection slide 90 which extends out of housing 5 is provided with a hand grip 92 which bears a coupling pin 93 which projects upward. As seen in FIG. 4, pin 93 can be brought into coupling engagement with a corresponding bore hole 94 of a coupling piece 95 disposed on the light protection slide 70 of container 51, when container 51 is inserted in housing 50, so that after such engagement the two light protection slides 70 and 91 must always be manipulated together, simultaneously and in the same direction. In order to prevent light protection slide 91 from being completely pulled out of housing 50, slide 91 bears a detent dog or the like 96, on the end of slide 91 opposite (directed away from) the hand grip 92, which dog 96 rests against a stationary detent surface 97 when the light protection slide 91 is in the correct open position.

Figure 6:
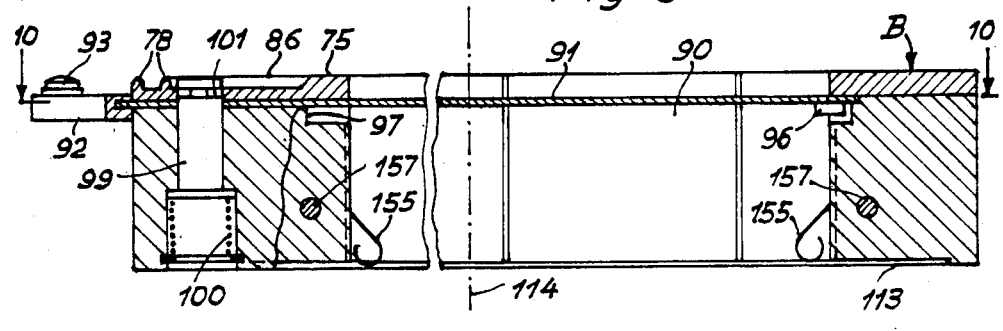
Figure 10:
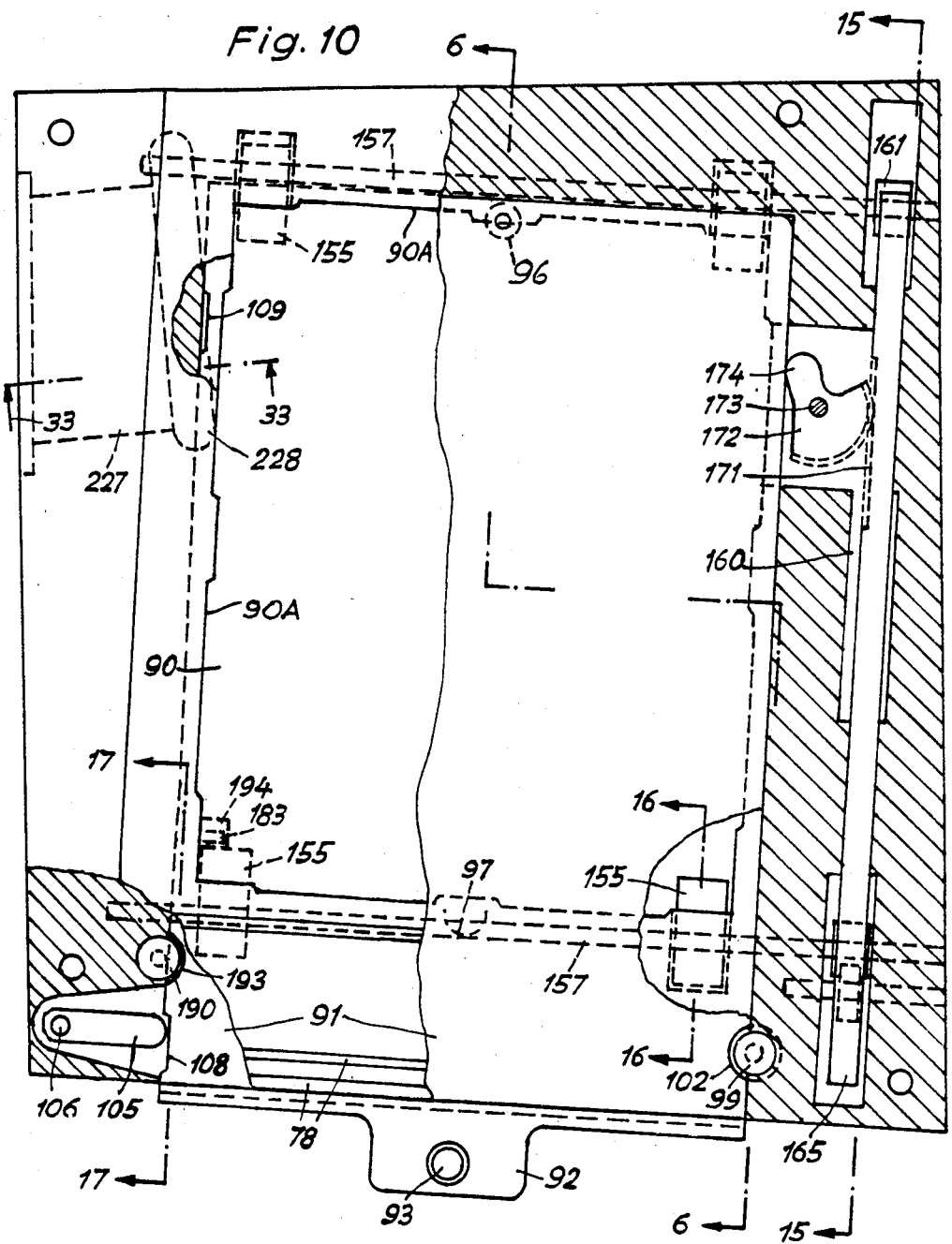
FIG. 10 is a partial plan view of the level B according to FIG. 6, and also a partial horizontal cross section of said level through line 10—10 of FIG. 6.
Figure 11:
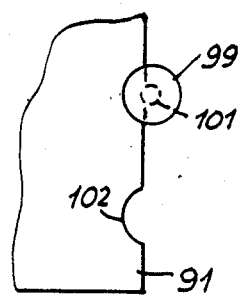
FIG. 11 illustrates a FIG. 10 when the light protection slide is partially opened.
Figure 12:
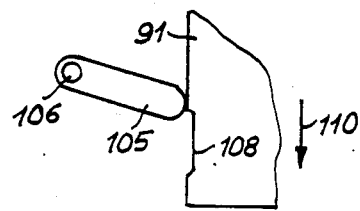
FIGS. 12-14 illustrate another feature of FIG. 10, at various positions of the light protection slide.

It is seen from FIGS. 6 and 10 that level B of housing 50 has a bore hole 98 outside of cavity 90 in which a piston 99 and an associated compression spring 100 are disposed. The action of spring 100 tends to slide piston 99 upward (FIG. 6). Piston 99 is provided with a circumferential groove 101 near its upper end.

Piston 99 serves as a locking organ to lock the light protection slide 91 in its closed position as long as container 51 is not correctly inserted in housing 50. Toward this end, light protection slide 91 has a notch 102 in the form of a circular segment (FIG. 10) on one of its longitudinal edges, and piston 99 is disposed such that part of it engages notch 102 and thereby holds light protection slide 91 in place when piston 99 is moved upward under the action of spring 100 to such an extent that circumferential groove 101 is located above the light protection slide. The upper end of piston 99 is free, and when container 51 is correctly inserted in housing 50 this upper end is pressed downward under the action of spring 100, such that circumferential groove 101 of piston 99 is moved into a position at the altitude of light protection slide 91. As a result, light protection slide 91 can then be manipulated, since its longitudinal edge bearing notch 102 can pass through circumferential groove 101 of piston 99, as shown schematically in FIG. 11.

Figure 13:
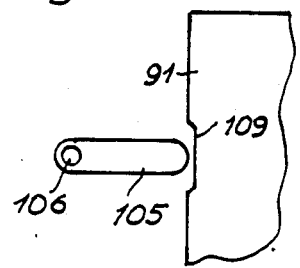
Figure 14:
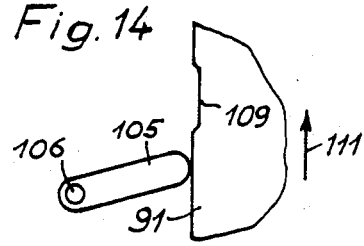

Also associated with light protection slide 91 (FIG. 10) is a back-thrust locking organ 105 in the form of a small swing arm swingable around a stationary axle 106, which arm is acted on by a spring (not shown) tending to hold arm 105 in the middle position illustrated. Two recesses 108 and 109 are disposed along one longitudinal edge of light protection slide 91. The free end of swing arm 105 can engage this recesses when the light protection slide is completely closed or completely open, respectively, wherewith in each case swing arm 105 assumes its middle position. If light protection slide 91 is moved from its closed position toward its open position, swing arm 105 will be forced into its deflected position (FIG. 12) by the adjoining longitudinal edge of the light protection slide, in which position swing arm 105 hinders backward sliding of the light protection slide in the direction opposite arrow 110, by means of a ratchet-type action. However, as soon as light protection slide 91 reaches its open position, the second recess 109 reaches the region of swing arm 105 and allows the latter to swing back into its middle position (FIG. 13). If subsequently light protection slide 91 is caused to move out of its open position and toward its closed position, in the direction of arrow 111 in FIG. 14, swing arm 105 is forced to move into an opposite swung (deflected) position to the swung (deflected) position mentioned supra, by the action of the longitudinal edge of the light protection slide (FIG. 14), whereby the swing arm prevents the light protection slide from sliding backward in the direction opposite arrow 111, again by a ratchet-type action. As soon as (but not until) light protection slide 91 again is moved into its closed position, recess 108 allows swing arm 105 to swing back into the middle position of arm 105. Thus, swing arm 105 and recesses 108 and 109 act to effectively prevent reversal of movement of the light protection slide 91 while the latter is being either opened or closed, until the light protection slide completely reaches its open or closed position, respectively.

The lowest level C of housing 50 bears a thin disc 112 on its upper side (FIGS. 4, 7, and 21) the thickness of which disc is approximately the same as that of an individual sheet of the photographic sheet material. The outer contour of disc 112 is generally circular, according to FIG. 21, and is rotatably guided in a circular guide recess 113 (FIG. 6) on the underside of middle level B, so that it is possible to rotate disc 112 around an imaginary axis 114 through its center. Disc 112 is also provided with a rectangular perforation 115 which in shape and size is adjusted to the lateral dimensions of a single sheet of the photographic sheet material and can accommodate such a sheet with relatively little play. This disc 112 with perforation 115 serves as a separating organ for single sheets in a stack, as a component of separating device 55 (FIG. 4). The manner of functioning of disc 112 will be described infra.

Another light protection slide 116 (FIGS. 4, 7, and 21) is disposed in level C immediately underneath disc 112. Slide 116 is movable into a closed position and an open position similarly to the above-described other light protection slides 57, 70 and 91. Light protection slide 116 which extends out of housing 50 has a hand grip 117 with a downwardly projecting coupling pin 118. As can be seen from FIG. 4, the coupling pin 118 can be brought into coupling engagement with a corresponding bore hole 119 in the grip border of the light protection slide 57 of cassette 53 (when this cassette is inserted in housing 50), whereafter the two light protection slides 57 and 116 must be manipulated together and in the same direction. In order to prevent complete withdrawal of light protection slide 16 from housing 50 a detent dog 120 is provided on the end of light protection slide 116 opposite (directed away from) hand grip 117, which dog rests against a stationary detent surface 121 on level C of housing 50 when the light protection slide 116 is in its open position.

Between light protection slide 116 and the cavity which accepts cassette 53 on level C of housing 50, there is provided a delivery opening 125 of the separating device 55 (FIG. 4), which opening 125 is adjusted in shape and size to the lateral dimensions of a sheet of the photographic sheet material (considered in the pass-through direction). In this connection, the cavity 90 in level B and the delivery opening 125 in level C have the same shape and size in a top view, but their attitudes, when viewed from the vertical direction, are mutually rotated with respect to imaginary axis 114. This can be readily seen by comparing FIGS. 10 and 21. Advantageously, cavity 90 in housing 50 has an attitude which is rotated 4' to 6' in one direction, and delivery opening 125 has an attitude rotated the same amount in the opposite direction. When the cassette 53 is correctly inserted in housing 50, the vertical boundary surfaces of delivery opening 125 and of cavity 56 of the cassette are flush. Thus, the cassette has the same rotated attitude in housing 50 as does delivery opening 125, whereas the container 52 inserted in the housing has an attitude rotated in the other direction, corresponding to the attitude of cavity 90 in level B. Disc 112 is rotatable such that its perforation 115 can be brought into an attitude coinciding with that of cavity 90 in level B, and by a different rotation into an attitude corresponding with that of delivery opening 125 in level C. In order to bring about the rotary excursions of disc 112 automatically in every case when light protection slide 116 is manipulated, the following means and measures are provided: According to FIG. 21, disc 112 is connected to one end of a link rod 131 by means of a link pin 130. The other end of rod 131 is connected to a swing arm 133, via a second link pin 132. Arm 133 is swingably mounted on level C of housing 50 by means of a pin 134, and bears a hook-shaped part 135. The organs 131–135 are disposed in recesses 36 in level C and are disposed beneath the bearing or support level of the disc 112. A strip 140 is attached to the underside of light protection slide 116 in a corner region of this slide. A catch hook 142 is swingably mounted on strip 140 by means of a pin 141. Hook 142 is intended to cooperate with hook-shaped part 135 of swing arm 133. A spring 143 acts upon hook 142, tending to swing this hook into an attitude in which it engages hook-shaped part 135 of swing arm 133 or in which it can move into engagement with this hook-shaped part. Strip 140 is slidably guided in a groove 144 in level C. Organs 131–143 also are disposed below the bearing or support level of disc 112.

A two-armed lever 145 is swingably mounted, in recess 136, in the neighborhood of the end of link rod 131 which end is connected to link pin 130; this mounting is accomplished by means of a pin 146. Thus, pin 146 is mounted on the body of level C. The free end of one arm of lever 145 is intended to cooperate with the neighboring longitudinal edge of light protection slide 116, while the other arm of lever 145 is intended to cooperate with the neighboring end of link rod 131. These interactions will be discussed infra. The this longitudinal edge of light protection slide 116 has a recess 147 in the region of lever 145.

Figure 22:
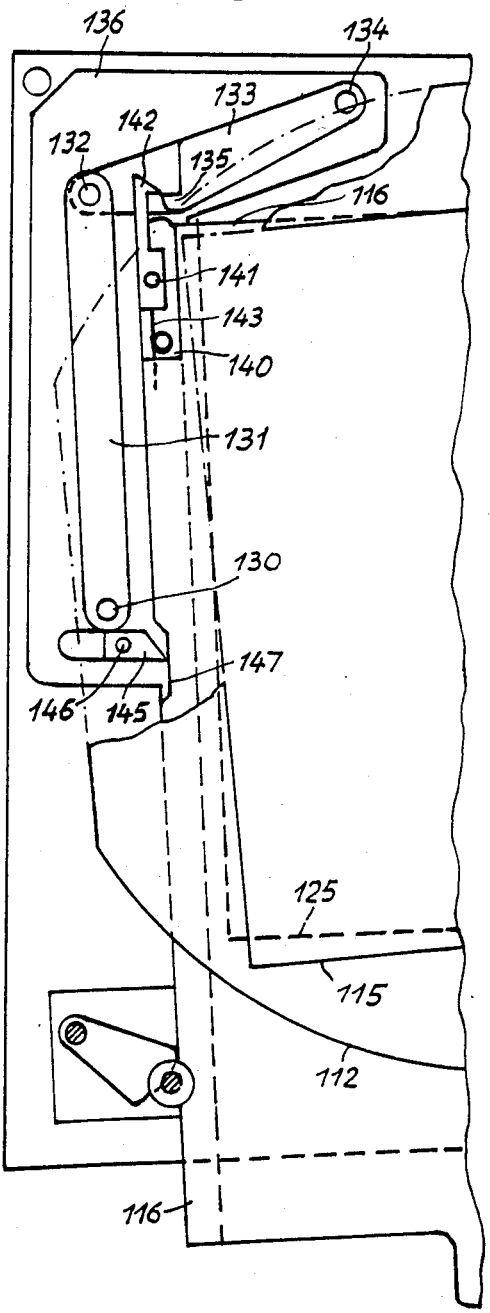
FIGS. 22 and 23 are views of the respective levels, analogous to the view in FIG. 21, for various positions of the movable component parts.
Figure 21:
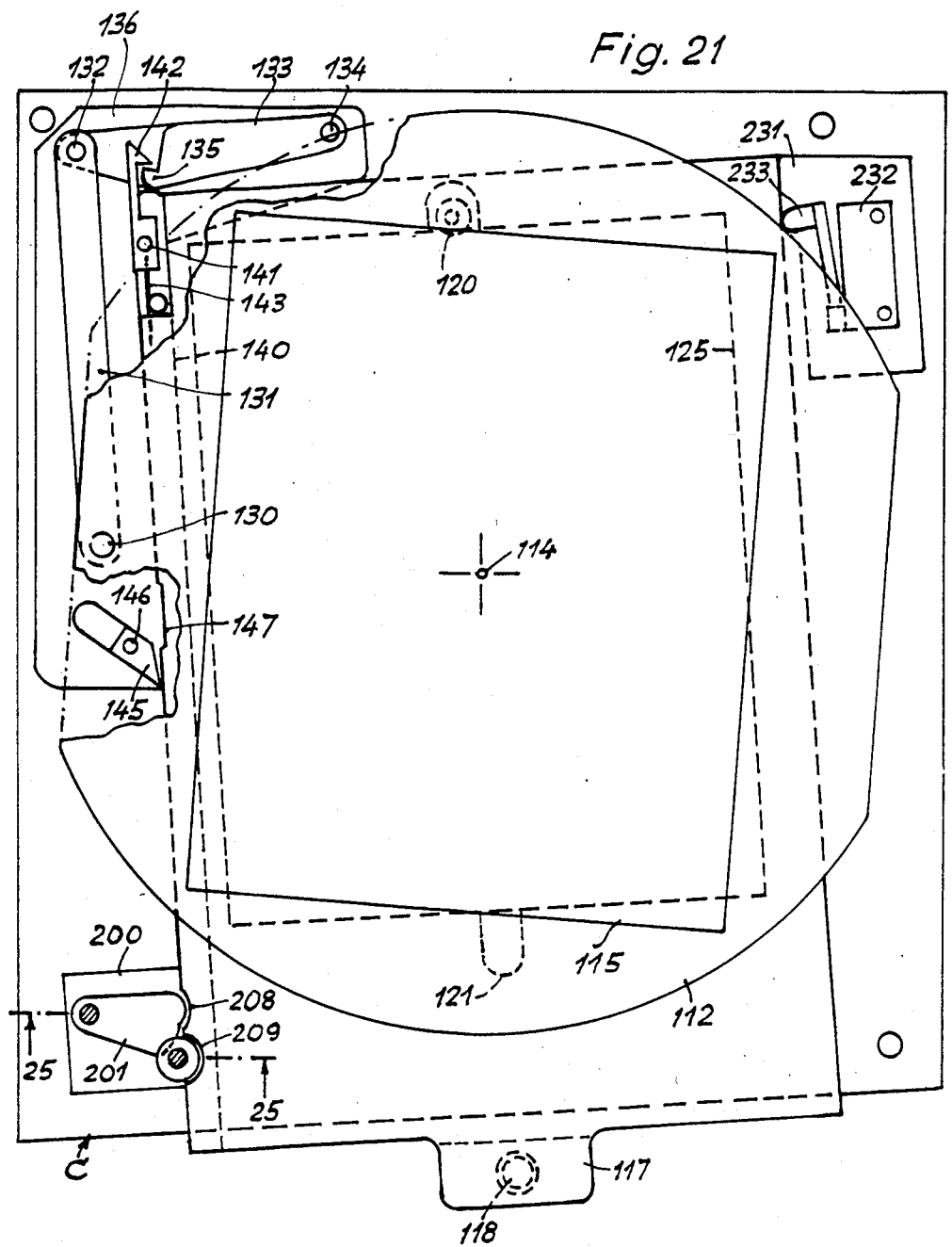
FIG. 21 is a plan view of the level (C) of the device illustrated in FIG. 7.
Figure 23:
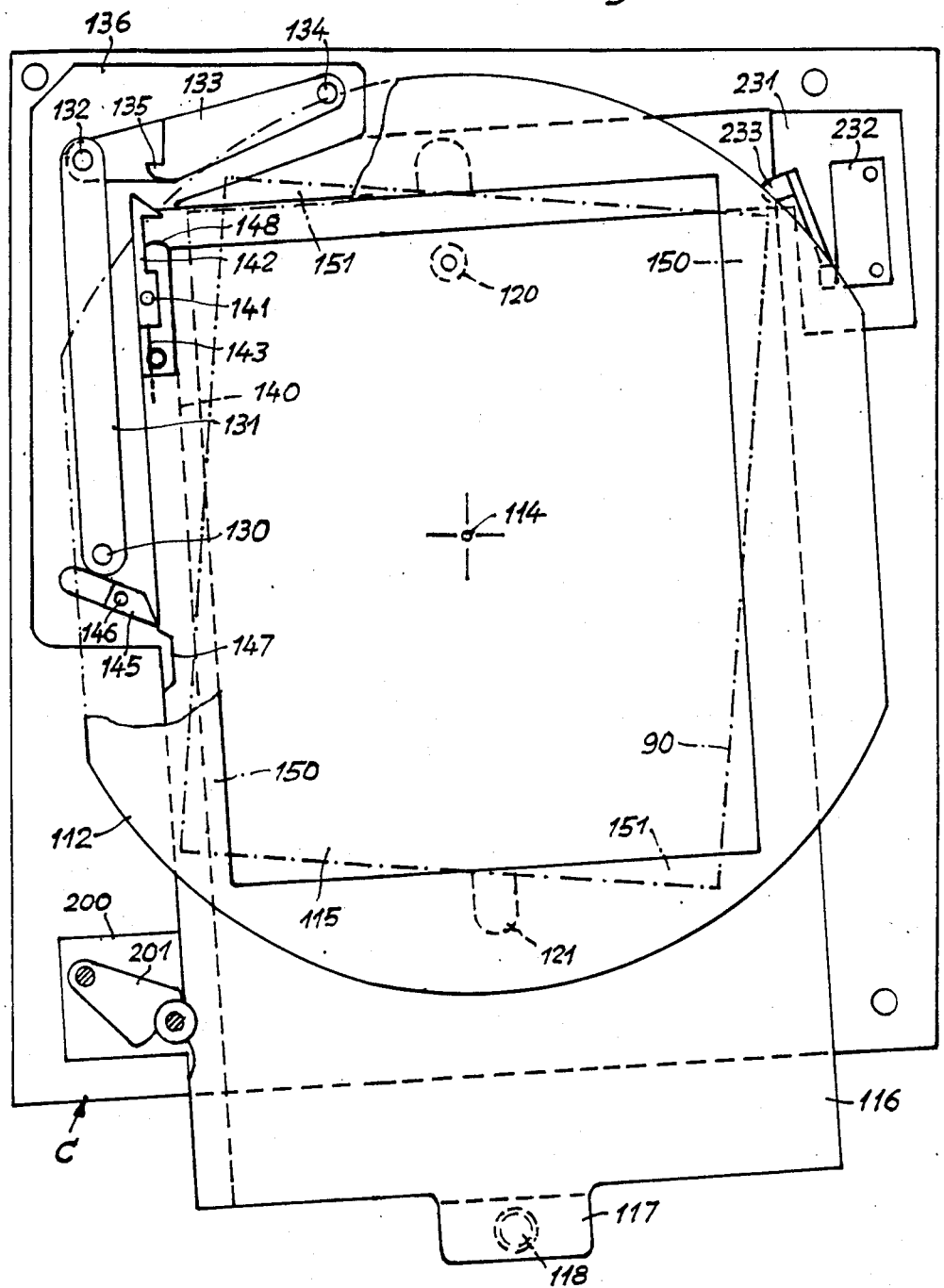
Figure 24:
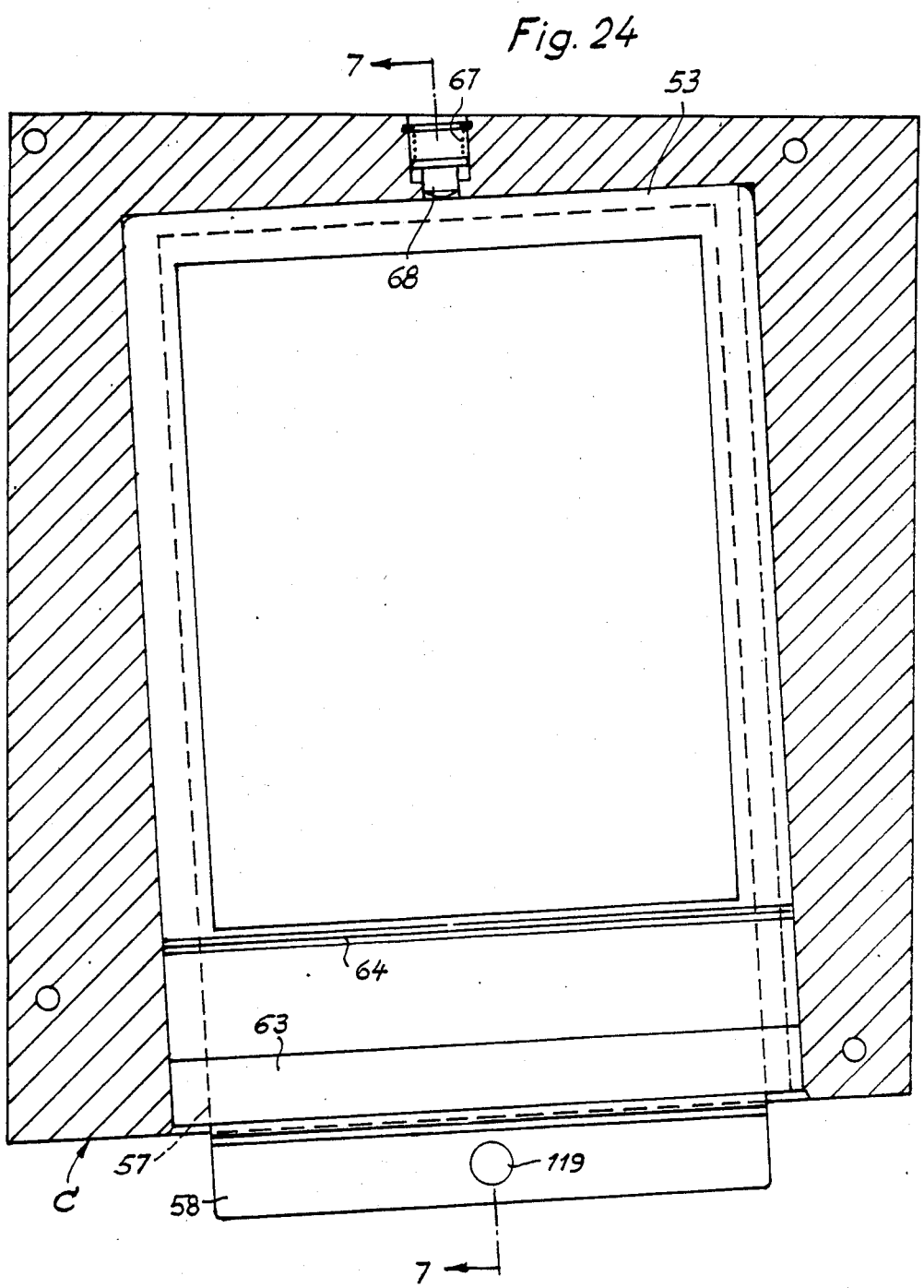
FIG. 24 is a horizontal cross sectional view through line 24—24 of FIG. 7.

When light protection slide 116 takes its closed position shown in FIG. 21, the rotational attitude of disc 112 is such that its perforation is in an attitude which coincides with the interior horizontal cross section of cavity 90 of level B of housing 50. If light protection slide 116 is moved out of its closed position toward its open position, swing arm 133 is swung counterclockwise by catch hook 142 (FIG. 2), whereby link rod 131 imparts a counterclockwise rotational movement to disc 112. This rotational excursion concludes when hook-shaped part 135 of swing arm 133 slides away from catch hook 142. The effective length of swing arm 133 is selected such that, by means of the abovementioned rotational excursion, disc 112 is rotated about 2'-4' farther than would be necessary to bring the perforation 115 of disc 112 into an attitude coinciding with the delivery opening 125 of level C. This is illustrated in FIG. 22. Immediately before hook-shaped part of swing arm 133 separates from catch hook 142, recess 147 on the one longitudinal edge of light protection slide 116 comes to be disposed in the region of the two-armed lever 145, as can be seen in FIG. 21. At the same time, the end of link rod 131 which is closest to lever 145 strikes this lever 145, whereby one end of lever 145 is brought into engagement with recess 147. As light protection slide 116 moves further toward its open position, recess 147 moves out beyond the region of lever 145, as shown in FIG. 23, whereby lever 145 is swung slightly clockwise, by means of the abovementioned longitudinal edge of light protection slide 116. The result of this is that the arm of lever 145 which arm cooperates with link rod 131 pushes link rod 131 slightly backward (in the upward direction in FIG. 23), whereby at the same time disc 112 is rotated back clockwise by means of link pin 130, until finally perforation 115 of disc 112 is in a rotational attitude which coincides exactly with that of delivery opening 125. Light protection slide 116 can be moved freely thereafter until it reaches its open position.

When light protection slide 116 is moved from its open position toward its closed position, disc 112 remains at rest until the now-advancing end 148 of strip 140 which strip is attached to light protection slide 116 strikes against the hook-shaped part 135 of swing arm 133 and the latter is swung clockwise back into its starting position according to FIG. 21. In the process, catch hook 142 automatically moves back into engagement with hook-shaped part 135; this is enabled by spring 143. As a result of swing arm 133 swinging back, disc 112 also rotates back into its starting position, in consequence of the kinomatics of link rod 131 and link pin 130; perforation 115 will then have a rotational attitude which coincides with that of cavity 90 of level B of housing 50.

It is important for trouble-free operation of the separating device 55 (FIG. 4) that in each instance the lowest sheet of the stack of sheet material in cavity 90 lies as flatly as possible on light protection slide 116 in the perforation 115 of disc 112, when said slide is closed, and does not hang down underneath, for when the light protection slide 116 is open, said sheet is supported solely by its corner regions, said support being on triangular flat regions 150 and 151 (FIG. 23) of disc 112 at the border region of perforation 115. In order to ensure this, i.e., that the sheet is so supported and does not fall or sag into the opening, four elastic (spring-loaded) hold-down organs 155 (FIGS. 4, 6, 10, 16, and 18) are provided in cavity 90 of level B of housing 50, which hold-down organs are intended to press down on the corner regions of the topmost sheet of the stack, or on the single remaining sheet (as the case may be), in cavity 90. All the hold-down organs 155 have the configuration illustrated in FIG. 16. The organ 155 proper is a finger-like end part of a spiral strip spring 156 which spring is wound around a shaft 157. The inner end of the spiral 156 is anchored in a longitudinal slot 158 in shaft 157. The organ 155 can be moved into an active pressing position or into an inactive position, by rotating the shaft 157. In the active pressing position, the free end of hold-down organ 155, under the action of the elasticity of the spiral coils, presses downward onto the topmost (or sole) sheet in cavity 90, wherewith if the rotational position of shaft 157 remains fixed, the hold-down organ 155 occupies the position shown by the solid line in FIG. 16 or a position pushed upward therefrom approximately as per the dot-dashed line 155A, depending on the number of sheets present in cavity 90. The inactive position illustrated by dot-dashed line 155B in FIG. 16 is brought about by sufficient rotation of shaft 157 in the counterclockwise direction, whereupon the hold-down organ is moved completely out of the interior area of cavity 90.

According to FIG. 10, two hold-down organs 155 may be disposed on a common shaft 157 (see top and bottom of FIG. 10). The following means and measures are provided to drive the shafts 157 for the purpose of moving the hold-down organs 155 into their pressure positions or into the inactive positions: It is seen from FIGS. 10 and 15 that level B of housing 50 has an additional recess 160 outside cavity 90, which recess has two parallel shafts 157 passing through it transversely. Each such shaft 157 has a spur gear (161 and 162, respectively) mounted on it inside recess 160, one of which gears meshes with an additional spur gear 163 which additional gear 163 is rotatably mounted on an idler shaft 164. Further, a bar 165 is mounted so as to be slidable longitudinally within recess 160. Each end region of said bar 165 (FIG. 15) bears a linear toothed rack (166 and 167, respectively), one of which racks meshes with gear 163 and the other with gear 162. It is readily seen that the two shafts 157 can be driven in opposite directions of rotation by sliding the bar 165 in its longitudinal direction. FIG. 15 also illustrates a tension spring 168, one end of which is hooked into an eye 169 which is connected to bar 165. The other end of spring 168 is attached to a pin 170 which is connected to the body of level B. The action of spring 168 tends to pull the bar 165 rightward in FIG. 15 (and upward in FIG. 10), thereby rotating the two shafts 157 such that all the hold-down organs 155 are moved into their inactive positions. According to FIG. 10, bar 165 is provided with another straight toothed rack 171 which meshes with a spur gear segment 172 which is rotatable around a vertical axle 173. Gear segment 172 bears an approximately radially extending arm 174 which is intended to interact with the neighboring edge of light protection slide 91 at the upper free opening of cavity 90. When light protection slide 91 is moved into its closed position, it strikes against arm 174 of gear segment 172, causing the latter to swing around axle 173 such that bar 165 is caused to move against the action of the tension spring (FIG. 15). This translational motion of bar 165 causes the two shafts 157 to move such that all the down organs 155 are moved into their pressing positions. If the light protection slide 91 is then moved back into its open position, the arm 174 of the gear segment 172 is released, whereby the action of tension spring 168 (FIG. 15) causes the hold-down organs 155 to move back into their inactive positions, via the transmission supplied by bar 165 and the spur gears 161 to 163.

According to FIGS. 17 and 18, level B of housing 50 is provided with still another recess 180 into which one of shafts 157 extends. A collar 181 is rotatably mounted on said shaft 157, within recess 180. A two-armed lever 182 is attached to said collar. One arm of lever 182 is in the form of a feeler finger 183 which extends laterally for a short distance into the cavity 90 of level B and is intended to sense the height of the stack of sheet material present in cavity 90. One end of a spring 184 (FIG. 18) is anchored to the shaft 157, and the other end is anchored to the lever 182. The action of this spring 184 tends to swing the lever 182 (FIG. 18) clockwise with respect to the shaft 157 so that feeler finger 183 in each instance is pressed against the topmost sheet in cavity 90. An arm 185 is also attached to collar 181, which arm bears a cylindrically curved part 186 disposed behind a window opening 187 in level B, which curved part 186 has a scale or set of markings for visually displaying the degree to which cavity 90 is filled with sheet film.

The arm of lever 182 which is disposed away from feeler finger 183 is intended to interact with a piston 190 (FIG. 17) which is slidably guided in a vertical bore hole 191 in the body of level B. Piston 190 has a circumferential groove 192 near its upper end. Hole 191 and piston 190 are disposed and configured such that part of the end region of the piston 190 which region is located above circumferential groove 192 can engage a notch 193 having the shape of a circular segment, which notch is provided on a longitudinal edge of light protection slide 91, as shown in FIGS. 10 and 20. If not even a single sheet of photographic sheet material is present in cavity 90, feeler finger 183 of lever 182, acted upon by spring 184, passes down through perforation 115 of disc 112 into a small recess 194 (FIGS. 17, 18, and 21) in an edge region of the light protection slide 116 disposed underneath disc 112. This causes slide 116 to be locked in place in its closed position, and allows lever 182 to assume a swung position such that its arm disposed away from feeler finger 183 slides piston 190 upward until circumferential groove 192 is positioned at the altitude of the upper light protection slide 91, as shown clearly in FIG. 17. At this position of piston 190, light protection slide 91 can be opened, because the longitudinal edge of slide 91 which edge is furnished with notch 193 can pass i.e., can be translated, unhindered through circumferential groove 192 of piston 190, said movement of said edge being in the longitudinal direction of said slide, as illustrated in FIG. 19.

As already described, when light protection slide 91 is opened, the shafts 157 are caused to rotate by means of the gear segment 172, the bar 165, and the spur gears 161 to 163, so that the hold-down organs 155 are moved into their inactive positions. At the same time, and in analogous fashion, lever 182 is swung into an inactive position by means of spring 184 (FIG. 18), which inactive position is indicated in FIG. 17 by the dot-dashed lines at 182A. A stack of sheet material can then be charged from above into cavity 90. When light protection slide 91 is closed, the hold-down organs 155 are swung automatically into their active pressing positions, as described, and at the same time also, lever 182 is swung back such that its feeler finger 183 rests against the topmost sheet of the stack, under the action of spring 184. As long as at least one sheet is disposed in cavity 90, lever 182 has a position of swing in which its arm disposed away from the feeler finger 183 allows the piston 190 to move downward to the extent permitted by hole 191, under the action of gravity. Accordingly, the end region of piston 190 located above circumferential groove 192 is in engagement with notch 193 of light protection slide 91, thus causing the latter to be locked in its closed position.

According to FIGS. 21 and 25 to 32, the light protection slide 116 disposed underneath rotatable disc 112 has associated with it a back-sliding prevention and locking device, which device will be described hereinbelow. A swing member 201 having the general shape of a circular sector is disposed in the recess 200 on the top side of level C of housing 50. Member 201 is affixed to a vertical axle 202, which axle is rotatably, as well as axially slidably, mounted in bore holes 203 and 204 of levels C and B. Swing member 201 is acted on by a compression spring 205 the action of which tends to slide member 201 downward in recess 200. A second spring 206, shown only schematically in FIGS. 26, 28, 30 and 32, has an action which tends to hold swing member 201 in a middle swing position of the member, from which position the member can be swung to one side or the other. A convexly curved end part 207 of swing member 201 is intended to interact with the neighboring longitudinal edge of light protection slide 116. The longitudinal edge bears a shallow notch 208 which lies in the region of swing member 201 when the light protection slide is in its closed position, the notch thus allowing the member to assume its middle swing position as shown in FIG. 26. Light protection slide 116 is further provided with a notch 209 adjoining notch 208, which notch 209 has the shape of a circular segment, and which notch 209 can be engaged by part of a piston 210 (FIGS. 25, 27, and 29-32) serving as a locking organ, in order to hold the light protection slide in place in its closed position. Piston 210 is slidably mounted in a vertical bore hole 211 of level B, and is acted upon by a compression spring 212 the action of which tends to move piston 210 upward and to bring the piston into engagement with notch 209. A pin 213 is longitudinally slidably guided in an axial bore hole of piston 210. The lower end of pin 213 is provided with a head 214. Pin 213 is also acted on by a compression spring 215 the action of which tends to move pin 213, and thereby head 214, downward.

Figure 25:
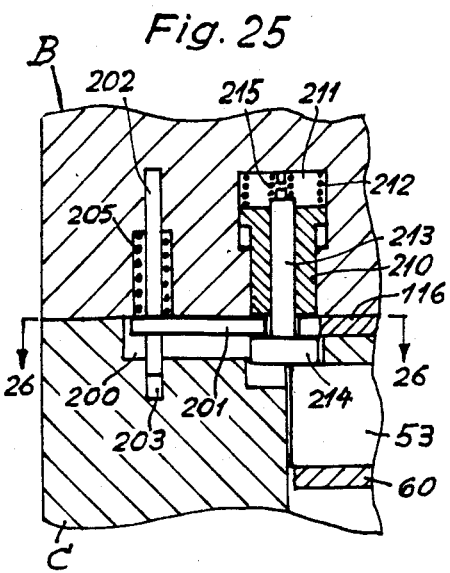
FIG. 25 is a vertical partial cross sectional view through line 25—25 of FIG. 21, shown enlarged.
Figure 27:
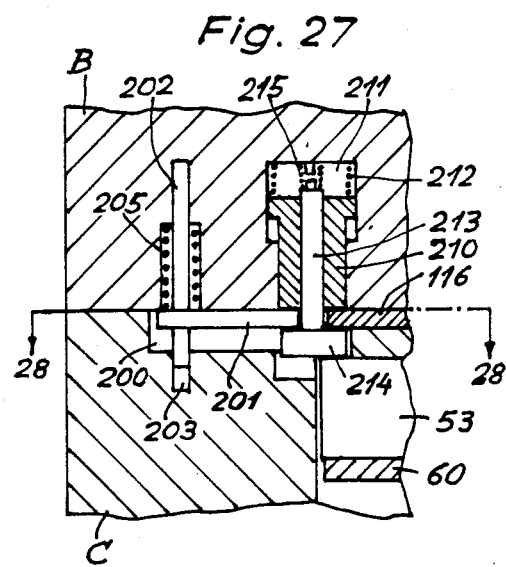
Figure 26:
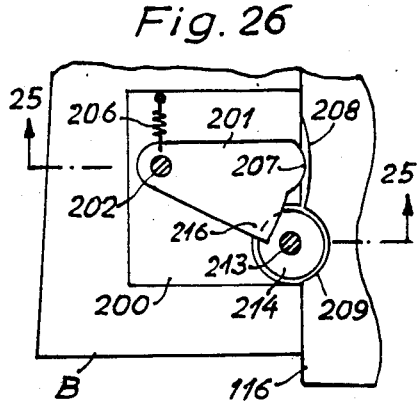
FIG. 26 is a horizontal cross sectional view through line 26—26 of FIG. 25.

When light protection slide 116 is closed and a cassette 53 is inserted in the space provided therefor in the bottom level C of housing 50, the above-mentioned moving component parts assume the positions illustrated in FIGS. 25 and 26. Swing member 201 is disposed in its middle swing position in which the curved end part 207 of the swing member engages the shallow notch 208 of the light protection slide. Another part 216 of swing member 201 is disposed between the head 214 and the lower end of piston 210. By mean of cassette 53, which is pressed upward by pressure plate 60 against detent shoulders 61 and 62 (FIGS. 4 and 7), head 214 is held in an upwardly displaced position, whereby also the swing member and the piston 210 are moved upward. Piston 210 is thus not engaged with notch 209 of the light protection slide 116, and therefore the latter can be moved into its open position.

Figure 28:
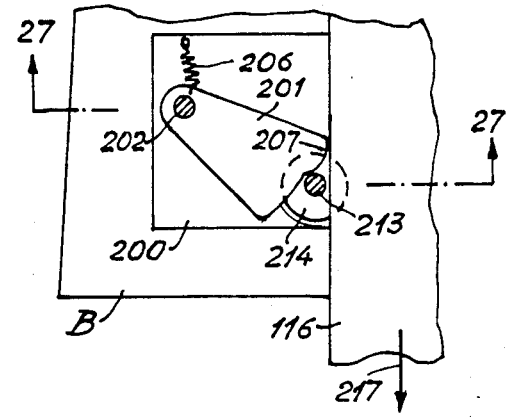

As soon as light protection slide 116 is moved a slight distance toward its open position, according to arrow 217 of FIG. 28 the shallow notch 208 is moved outside the region of swing member 201, and the latter is swung by the neighboring longitudinal edge, i.e., the edge near notch 208, of the light protection slide and against the action of spring 206, as seen in FIG. 28. In this swing position, swing member 201 exerts a blocking action on light protection slide 116, to prevent back-sliding against the direction of arrow 217 while not hindering further movement toward the open position. When the open position of light protection slide 116 is reached, swing member 201 has the opportunity to return to its middle swing position, under the action of spring 206.

If light protection slide 116 is then moved from its open position toward its closed position, in the direction of arrow 218 of FIG. 30, the longitudinal edge of the light protection slide again travels against the curved end part 207 of swing member 201, whereby member 201 is swung out of its middle position in the opposite direction from that described supra, as shown in FIG. 30. In this swing position the swing member 201 exerts a blocking action on light protection slide 116, preventing movement in the direction opposite to that of arrow 218. In addition, in this swing position of swing member 201, the part 216 of the member is no longer in contact with the lower end of piston 210, so that said lower end now rests on the longitudinal border of light protection slide 116, under the action of spring 212. As soon as the light protection slide moves into its (the light protection slide's) closed position, the piston drops into slot 209 under the action of spring 212, whereby the light protection slide is locked in said closed position, as shown in FIGS. 29 and 30. The swing member 201 is also pushed downward under the action of spring 205, whereafter member 201 is prevented by head 214 from moving back into its (member 201's) middle swing position.

Before the light protection slide 116 can be reopened and reclosed, the cassette 53 must be removed from level C and replaced by another, empty cassette. The removal of cassette 53 allows the head 214 to also move downward under the action of spring 215 until head 214 rests on detent shoulder 219, as seen in FIG. 31, whereupon spring member 201 has the opportunity to return to its (member 201's) middle swing position, in which position its part 216 is engaged between the head 214 and the lower end of piston 210. If subsequently a new cassette is inserted in level C, the head 214 is moved upward by the cassette, whereby the starting position of the moving parts, as shown in FIGS. 25 and 26, is brought about.

It will be recognized that two things are accomplished by the configuration shown in FIGS. 25-32: First, the swing member 201 serves as a back-sliding prevention organ, to effectively prevent any reversal of movement of the light protection slide 116 during the movement of said slide from the closed position of said slide to the open position of said slide (or vice versa—during the movement from the open position to the closed position). Secondly, the piston 210 serves as a locking organ to lock the light protection slide 116 in place in its (slide 116's) closed position after each manipulation of said slide 116 (i.e., each single cycle of opening and closing), until the cassette 53 in level C is replaced. Thereby any possible inadvertent introduction of two photographic sheets into a single cassette is prevented.

Further, a labeling arrangement 225 is provided in level B of housing 50 (FIG. 33), which arrangement is suitable for applying photographic labels, such as date, time, copyright notice, etc., onto the light-sensitive layer of the sheet released by the separating device 55 (FIG. 4). The labeling arrangement 225 is disposed in a recess 227 in level B which recess is accessible from the side and is closed off by a removable cover 226, which recess 227 is also shown in FIG. 10. A slot-shaped opening 228 leads from recess 227 to the shallow, circular-shaped recess 113 in which disc 112 is rotatably mounted. The labeling arrangement 225 comprises a mask 229 with light-permeable and light-impermeable parts, and a strobe light source or the like 230 which source is intended to beam light through the light-permeable parts of mask 229 and through the slot-shaped opening 228. The above-described labeling arrangement 225 is disposed outside cavity 90 in level B, namely above a corner region of delivery opening 125 in level C, so that when disc 112 is rotated into the rotational position illustrated in FIGS. 23 and 33, a border region of perforation 115 of disc 112 comes to rest underneath opening 228. An electrical switch 232 (FIG. 21) is disposed in a recess 231 in the top side of level C. Switch 232 bears an actuating arm 233 which interacts with a longitudinal edge of light protection slide 116. When light protection slide 116 is moved out of its closed position and toward its open position, there results rotation of disc 112 into the rotational position illustrated in FIG. 23 (as has been described supra with reference to FIGS. 21-23). As soon as this rotational position of disc 112 is reached, the longitudinal edge of the light protection slide which edge interacts with actuating arm 233 slides away from the arm 233, whereby switch 232 is tripped and strobe light source 230 is triggered, giving off a short burst of light.

It has been described above in connection with FIGS. 22 and 23 that disc 112 is rotated at first farther than necessary and is then rotated back a slight amount. In this way, in each instance the photographic sheet lying in the perforation 115 of disc 112 presses adequately with its cut edges against the boundary surface 234 (FIG. 33) which runs in the region of the labeling arrangement 225, at the time when the strobe light source is triggered. Thereby the label which is exposed onto the sheet always has the same distance from the associated cut edge of the sheet, regardless of the necessary play which the sheet must have in the perforation 115 of the disc 112, and regardless of the varying surface dimensions of commercial photographic sheets, which may vary within customary tolerances.

If desired, a second labeling arrangement of the type described may be disposed at a diametrically opposite location of level B.

The vertical boundary surfaces of cavity 52 of container 51, and of cavity 90 in level B, are advantageously provided with vertically running ridges and/or grooves 52A (FIG. 8) and 90A (FIG. 10), respectively, in order to facilitate pressure equalization of the air above and below the sheets, and thereby to assist the settling of the sheets by gravity.

The following is a brief description of the overall mode of use and operation of the described apparatus:

It is assumed that a stack of 20 to 50 photographic film sheets is present in cavity 52 of container 51, which stack is inserted therein either at the factory or by the photographer, in darkness. Light protection slide 70 of container 51 is closed in order to shield the film sheets from ambient light. The filled container 51 is inserted in the manner indicated in FIG. 4 into the space provided therefor in the upper level A of housing 50, wherewith the coupling pin 93 on light protection slide 91 of level B automatically comes into coupling engagement with bore hole 94 of coupling piece 95 on light protection slide 70 of container 51. When container 51 is inserted, the pistons 83 and 99 in the container (FIGS. 5 and 8) and in level B (FIGS. 6 and 10), respectively, which pistons serve as locking organs, are pushed into their inactive positions, also automatically, so that the light protection slides 70 and 91 are released. It is further assumed that there are no longer any film sheets in cavity 90 of level B, and thus that the piston 190 which serves as a locking organ is pushed into its inactive position, by means of lever 182 (FIG. 17), whereby light protection slide 91 is no longer locked into its closed position. Then the two light protection slides 70 and 91 which are coupled together can be moved into their open positions, whereby the shafts 157 in level B are rotated automatically by means of spur gear segment 172, bar 165, and spur gears 161-163, such that all the hold-down organs 155 are swung into their inactive positions, along with lever 182, whereby they are disposed completely outside the free cross section of cavity 90. The stack of photographic film sheets then falls by gravity from container 51 into the cavity 90 of level B, which cavity acts as an accumulation space. Thereupon, the operator slides the two light protection slides 70 and 91 in tandem into their closed positions, whereafter the empty container 51 is removed from level A, and if desired said container can be used for another purpose. When container 51 is removed, light protection slide 91 at the upper free opening (or entry opening) of cavity 90 is automatically again blocked in its closed position by means of piston 99. When slide 91 moves into its closed position, the hold-down organs 155 and the lever 182 are automatically swung back into their active positions, in which the hold-down organs 155 and the feeler finger 183 rest on the topmost sheet of the stack in cavity 90. The bottommost film sheet then is disposed within perforation 155 of rotatable disc 112, on light protection slide 116 of level C.

As long as no cassette 53 is inserted in the space provided therefor in the lowest level C, light protection slide 116 is locked in place in its closed position by means of piston 210 (FIGS. 31 and 32) which serves as a locking organ. If the operator inserts a cassette into level C, then the piston 210 is automatically moved into its inactive position, and thereby light protection slide 116 is released (FIGS. 25 and 26). When the cassette 53 is inserted, the coupling pin 118 on light protection slide 116 is automatically brought into engagement with bore hole 119 in hand grip 58 of light protection slide 57 of the cassette. Therefore, the two light protection slides 116 and 57 must be manipulated in tandem, in the same direction. If the operator moves them together into the open position, disc 112 which serves as a separating organ for single sheets, is automatically moved in a rotational excursion, so that perforation 115 is rotated out of its rotational position (FIG. 21) in which it coincides with the horizontal cross section of cavity 90 and into the rotational position which coincides with the horizontal cross section of delivery opening 125 (FIG. 23). In this way, the bottommost film sheet, which lies in perforation 115, is separated from the rest of the stack in cavity 90 and is delivered into delivery opening 125. Immediately before the thus separated film sheet can fall into delivery opening 125, the strobe light source 230 of the labeling arrangement 225 (FIG. 33) is triggered by means of the switch 232, whereby the light-permeable label embodied in the mask 229 is projected onto one edge of the film sheet. Subsequently, the separated film sheet falls by gravity through the delivery opening 125 and into the cavity of cassette 53. Thereafter, the operator slides the two light protection slides 116 and 57 in tandem into their closed positions, whereupon light protection slide 116 is automatically locked in place in its closed position (FIGS. 29 and 30) by means of piston 210 which serves as a locking organ. Finally, the operator may remove cassette 53, which has been loaded with a single film sheet, out of level C of housing 50, and can use it for photographic purposes.

In the manner described, the film sheets present in cavity 90 can be individually fed into cassettes 53, in (and protected from) full ambient light. When the last film sheet has been delivered by means of the rotatable disc 112, and light protection slides 116 and 57 have been moved into their closed positions, feeler finger 183 of lever 182 falls into recess 194 of light protection slide 116 (FIG. 17), whereby slide 116 is locked in its closed position. This prevents the operator from believing that he has loaded and prevents him from attempting to load one or more additional cassettes with film sheets when there are no longer any more film sheets present in cavity 90.

As long as at least one film sheet is present in cavity 90, light protection slide 91 on the upper free opening (or entry opening) of cavity 90 cannot be opened, even if a container 51 is inserted in the upper level A. This locking action is afforded by means of piston 190 (FIGS. 10 and 19). In this way, overfilling of cavity 90 is prevented.

The case may also occur in which the photographer desires to remove film sheets which are still present in cavity 90 and replace them with other sheets, e.g. sheets having a different sensitivity, and in doing so he will also wish to prevent any light from contacting the film sheets which are being replaced. This can be accomplished in simple fashion by means of the described apparatus, as follows: An empty container 51 is inserted in the space provided therefor in level A, whereby, as already described, the pistons 83 and 99 (FIGS. 5 and 6) which serve as locking organs for light protection slides 70 and 91 are pushed into their inactive positions. Then the entire apparatus is turned upside down so that level A becomes the lowest level and level C becomes the top level. In this position of the apparatus, piston 190 (FIG. 17) in level B moves automatically by gravity into its inactive (as a locking organ) position, wherein circumferential groove 192 of piston 190 is flush with, i.e., at the same altitude as, light protection slide 91. The two mutually coupled light protection slides 70 and 91 can then be opened in tandem, whereafter the film sheets still present in cavity 90 fall by gravity into cavity 52 of container 51. Thereafter, the operator slides the two slides 70 and 91 back into their closed positions, whereupon he can remove container 51 (which contains the removed film sheets) fro the level, i.e., level A. The film sheets present in container 51 may later be recharged into cavity 90, as required, in the manner described earlier.

It is seen that the described apparatus affords a convenient and secure means of handling light-sensitive photographic sheet material in the presence of full ambient light, without danger of undesired light contact with the photographic sheet material. It is also seen that the apparatus is configured and constructed in advantageous fashion, so that, in consequence of the various locking actions, it is practially impossible to improperly manipulate it.

FIGS. 34–37 illustrate an example of an apparatus which enables expose or unexposed film sheets to be charged from cassettes into a container, in full ambient light, without the hazard of harmful light contact with the film sheets. This apparatus is comprised of a housing 250 which in turn in comprised of two levels D and E vertically stacked sandwich-like. The upper level D is intended to receive a cassette 53 of the type described supra, but the cassette is inserted upside down, i.e. with the pass-through opening of its cavity 56 directed downward. The lower level E is intended to receive a container 51 of the structure described supra, but the container is inserted with the pass-through opening of its cavity 52 directed upward. According to FIG. 36, pass-through openings 253 and 254, respectively, are provided in the bottom 251 of upper level D and in the cover 252 of lower level E, which openings are adjusted in shape and size to the lateral dimensions of a sheet of the photographic sheet material. The openings 253 and 254 have coinciding attitudes, and are aligned over cavity 56 of cassette 53 which cassette is inserted in level D, and over cavity 52 of container 51 which container is inserted in level E.

A pressure plate 256 for pressing cassette 53 against the bottom 251 of level D is disposed in upper level D and is acted upon by springs 255. Analogously, a pressure plate 258 is disposed in level E for pressing container 51 against the cover 252 of level E, which plate 258 is acted upon by springs 257. Cassette 53 and container 51 are slidable into housing 250 in the manner of drawers. A recess is provided in the rear wall region 259 of upper level D, in which recess a bumper 262 is slidably mounted, which bumper is acted upon by a compression spring 261. Cassette 53 rests against said bumper. The action of spring 261 and bumper 262 tends to slide cassette 53 a slight distance out of level D. This protrusion of cassette 53 is prevented however, as long as ridges 63 and 64 of the cassette are engaged in corresponding grooves in the bottom 251 of level D. Analogously, a bumper 265 is provided in the rear wall region 263 of the lower level E, which bumper is acted on by a spring 264. Container 51 presses against bumper 265. The action of spring 264 and bumper 265 tends to slide container 51 a slight distance out of level E. However this protrusion of container 51 is prevented as long as grooves 77 of container 51 engage corresponding ridges on the cover 252 of level E. Levels D and E, which are configured as described, together form a connecting structure for light-tight connection of cavities 52 and 56 of container 51 and cassette 53, respectively.

A light protection slide 270 is disposed between the bottom 251 of the upper level D and the cover 252 of the lower level E, which slide is movable into a closed position which closes off the pass-through openings 253 and 254 in light-tight fashion, and into an open position which completely exposes the said pass-through openings. The end of light protection slide 270 which extends out of housing 250 is provided with a coupling piece 271 bearing two coupling pins 272 and 273. These pins are intended to enter into coupling engagement with bore hole 119 in grip border 58 on light protection slide 57 of cassette 53, and with bore hole 94 in coupling piece 95 on light protection slide 70 of container 51, respectively, when the cassette and the container are inserted in housing 250. The three light protection slides 57, 70, and 270 are then coupled together, so that they can be moved simultaneously and in the same direction. Light protection slide 270 has a detent dog or the like 274 in the neighborhood of its end directed away from coupling piece 271, which dog strikes against a detent surface 275 when the light protection slide reaches its open position. In this way, complete withdrawal of light protection slide 270 from housing 250 is excluded.

Figure 37:
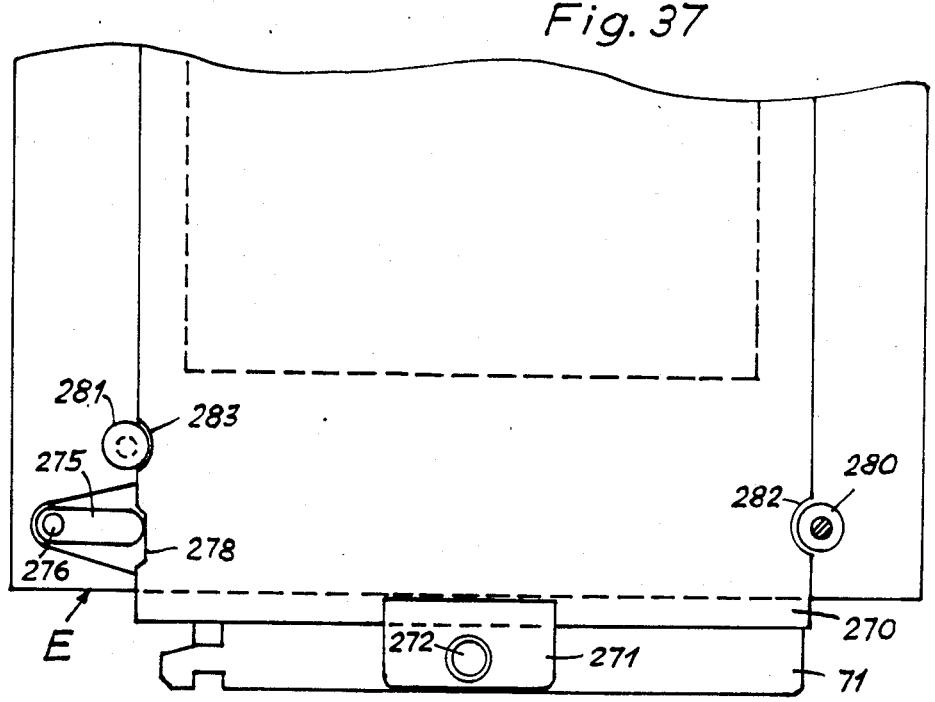
FIG. 37 is a plan view of the lower level E, which level encompasses the container, said lower level being the lower level of the device according to FIGS. 34–36 which device is comprised of two levels.

According to FIG. 37, light protection slide 270 is associated with a back-sliding prevention organ 275 in the form of a small swing arm which is swingable around an axle 276 and is acted upon by a spring (not shown) the action of which tends to hold swing arm 275 in the middle position shown, from which position arm 275 is swingable in one or the other lateral direction. Two shallow notches 278 are provided in the longitudinal edge of light protection slide 270 which edge is disposed near swing arm 275; only one of the notches 278 is visible in FIG. 37. These notches 278 are disposed such that the free end of swing arm 275 can engage them when light protection slide 270 assumes its closed or open position. The operation of swing arm 270 is essentially the same as that of swing arm 105 described with reference to FIGS. 10, 12, 13, and 14, in connection with which swing arm 105 acts i.e., "was described as acting" as a back-sliding prevention organ for light protection slide 91. Swing arm 275 prevents any reversal of movement of light protection slide 270, either during opening or during closing of said slide, as long as said slide has not been completely moved into its open or closed position, respectively.

Further, two locking organs 280 and 281 are associated with light protection slide 270, each of which organs can engage a corresponding notch (282 and 283, respectively) of slide 270 in order to lock slide 270 in place in its slide 270's closed position, as long as no cassette 53 is inserted in level D and—evidently should be "or" no container 51 is inserted in level E. Locking organs 280 and 281 are configured analogously to locking organ 99 described with reference to FIGS. 6, 10, and 11, namely such that locking organ 280 is moved into an inactive position when cassette 53 is inserted, and the other locking organ 281 is moved into an inactive position when container 51 is inserted (an inactive position being namely one which releases light protection slide 270 vis-a-vis the respective locking organ).

Figure 34:
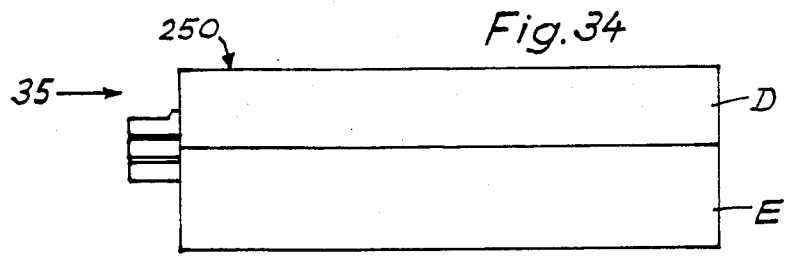
FIG. 34 is a side view of a device for unloading a cassette and for transferring the exposed sheet film which has been removed from the cassette into a container in which a plurality of exposed film sheets can be stacked.
Figure 35:
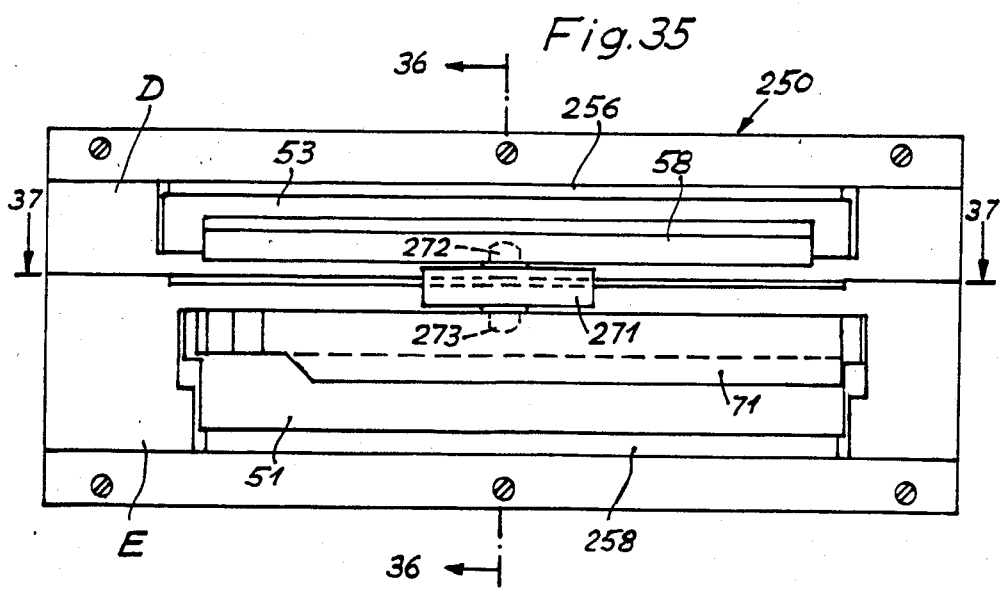
FIG. 35 is a view of the same device, in the direction of arrow 35 of FIG. 34.

The manner of use and operation of the apparatus according to FIGS. 34-37 is as follows:

If the desires to remove exposed film sheets from one or more cassettes 53 and to hold them safely out of the light until they are developed, said removal being for the purpose of being able to reload the cassette(s) with unexposed film sheets, he inserts an empty container 51 in the space provided therefor in the lower level E of housing 250, and inserts a cassette 53 (which is to be unloaded) into the corresponding space in the upper level D, as illustrated in FIGS. 34-36. The insertion of the container and the cassette causes the locking organs 280 and 282 respectively, to be moved automatically into their inactive positions, thus releasing the locked status of light protection slide 270. Also, when container 51 and cassette 53 are inserted, their light protection slides 70 and 57 become automatically coupled to light protection slide 270, by means of coupling pins 272 and 273. Then the three light protection slides 57, 70, and 270 can be moved together as a unit into their open positions, whereafter the exposed film sheet falls by gravity from cassette 53 into container 51. Then the photographer slides light protection slides 57, 70, and 270 back into their closed positions, whereupon the now-empty cassette 53 can be removed from level D and can be reloaded with an unexposed film sheet by means of the first-described apparatus according to FIGS. 1-33.

In the manner described, the exposed film sheets from a plurality of cassettes can be charged one after another into a single container, and finally the film sheets can be removed from the container and sent to development.

FIG. 38 illustrates an example of an apparatus which enables exposed film sheets to be transferred from a container into a photographic developing apparatus, in full ambient light. The transfer apparatus comprises a housing 290 comprised of three levels F, G, and H, which are vertically stacked sandwich-style. The first level F and the middle level G have practically the same configurations as levels A and B respectively of the first above-described device which was described with reference to FIGS. 1-33. The lower level H is an adapter which enables the apparatus to be connected in light-tight fashion to a connecting piece 291 on the feed inlet 292 of the developing apparatus. In other respects, level H is configured substantially the same as the bottom level C of the device according to FIGS. 1-33, with the exception that it has no space for inserting a cassette. Rather, level H has an opening 295 which extends through it vertically, which opening corresponds to the delivery opening 125 of the above-described level C, and which has a horizontal cross section which is in a rotated attitude with respect to cavity 90 of level G, in similar fashion to the attitude of the delivery opening 125. A photographic labeling apparatus such as is present in level B and has been described supra with reference to FIGS. 10 and 33 may also be provided in level G, in order to label the film sheets with, e.g., the developing date, or with other data connected with developing. Advantageously, in contrast to the labeling arrangement of FIGS. 10 and 33, the labeling arrangement in level G is disposed such that the labels are applied to at least one location which is different from that upon which the labels were produced at the time of the loading of the cassettes.

The mode of use and operation of the apparatus according to FIG. 38 is briefly as follows:

Assume that there are no film sheets in cavity 90 of level G. Light protection slide 91 on the uppe free opening (or entrance opening) of cavity 90 is locked in its closed position, as long as no container 51 is inserted in the space provided therefor in the top level F. When a container 51 containing a stack of exposed film sheets is inserted, the locked status of light protection slide 91 is released, and the latter is automatically coupled to light protection slide 70 of the container by means of the coupling pin. If the two light protection slides 70 and 91 are then opened in tandem, the entire stack of film sheets falls by gravity from container 51 into cavity 90 of level G. After the two light protection slides 70 and 91 are closed, the empty container can be withdrawn from level F, and if desired may be used for another purpose. When light protection slide 116 of level H is then moved into its open position, disc 112, which serves as a separating organ for single sheets in the stack, is caused to execute a rotational excursion whereby the bottommost film sheet, which is located in perforation 115 of disc 112, is carried along in said rotation, and can then fall into pass-through opening 295 of level H. At the same time, if desired, the said film sheet undergoes labeling immediately before it falls into pass-through opening 292. When subsequently light protection slide 116 is moved into its closed position, disc 112 is automatically rotated back into the initial position (attitude) of said disc, whereupon the next film sheet of the stack slips into the perforation 115. The separated-out and delivered film sheet falls from pass-through opening 295 of level H into the feed inlet 29 of the developing apparatus. When light protection slide 116 is again manipulated, the next film sheet is transferred into the developing apparatus, in the manner described, when and if this developing apparatus is again ready to receive a sheet.

FIG. 39 illustrates a simplified apparatus which enables an exposed film sheet to be transferred directly from a cassette 53 into a developing apparatus, while completely excluding light. This apparatus comprises a housing 300 comprised of only two levels, J and K, which are vertically stacked sandwich-like. The upper level J has the same configuration as the upper level D of the apparatus according to FIGS. 34-37, and is also intended to receive a cassette 53. The lower level K of housing 300 is an adapter which enables the apparatus to be joined in light-tight fashion to a connecting piece 291 on the feed inlet 292 of the developing apparatus. Level K has an opening 301 which passes through it vertically, the free cross section of which opening is adjusted in shape and size to the lateral dimensions of a film sheet, wherewith the horizontal cross section of opening 301 coincides with that of cavity 56 of cassette 53 when said cassette is inserted in level J. Level K is further provided with a light protection slide 302 which can be moved into a closed position which closes off opening 301 in light-tight fashion, and into an open position which completely exposes the free area of recess 301. One end of light protection slide 302 extends out of housing 300 and is furnished with a coupling piece 303 attached to it and bearing a coupling pin 304 which is intended to come into engagement with bore hole 119 of grip border 58 on light protection slide 57 of cassette 53 when the cassette is inserted into level J. A detent dog 305 is attached to the end of light protection slide 302 which end is directed away from coupling piece 303. When light protection slide 302 is in its open position, dog 305 abuts a detent surface 305 of level K, thereby preventing light protection slide 302 from possibly being withdrawn completely from housing 300. Light protection slide 302 has associated with it a locking organ (not shown) for locking it into its closed position as long as no cassette 53 is inserted in level J. The locking organ may be configured similarly to locking organ 99 (FIGS. 6 and 10) of the apparatus first described hereinabove. Further, advantageously a backsliding prevention organ is associated with light protection slide 302, which backsliding prevention organ is configured, e.g., similarly to swing arm 105 according to FIG. 10, and serves to prevent reversal of movement of light protection slide 302 while the slide is undergoing opening or closing, as long as the slide has not been completely moved into its open or closed position.

The manner of use and operation of the apparatus according to FIG. 39 is briefly as follows:

As long as no cassette is inserted in upper level J of housing 300, light protection slide 302 remains locked in its closed position, thereby preventing any light from penetrating into feed inlet 292 of the developing apparatus. When the photographer wishes to transfer the exposed film sheet in cassette 53 into the developing apparatus, he inserts the cassette into the space provided therefor in the upper level J, whereby the locked status of light protection slide 302 is automatically released, and light protection slide 302 is coupled to the light protection slide 57 of cassette 53 by means of coupling pin 304. When the two light protection slides 57 and 302 are then opened in tandem, the film sheet falls out of cassette 53 by gravity, through opening 301 of level K and directly into feed inlet 292 of the developing apparatus. After the two light protection slides 57 and 91 are closed, the empty cassette 53 can be removed from level J and can be reloaded with an unexposed film sheet by means of the apparatus described first supra.

FIG. 40 schematically illustrates another apparatus, comprising a housing 310 which is comprised of three levels, L, M, and N, which are vertically stacked sandwich-like. The topmost level L is basically of an identical configuration to the middle level B of the apparatus first-described hereinabove with reference to FIGS. 1-33. The bottom level N has a configuration which is practically the same as that of the bottom level E of the apparatus described according to FIGS. 34-37, and accordingly is intended to receive a container 51 with a cavity 52 having an upwardly directed free opening. Middle level M has a configuration similar to that of bottom level C of the apparatus according to FIGS. 1-33, and can accept a cassette 53; under the circumstances, there is a choice enabled of sliding in the cassette with the free opening of its cavity 56 directed either upward or downward.

The mode of use and operation of the apparatus according to FIG. 40 is as follows:

Light protection slide 91 is disposed on the upper free opening (or entry opening) of cavity 90 of level L. The photographer must open slide 91 in a darkroom (or otherwise in darkness) and then load a stack of unexposed film sheets into cavity 90. He then closes light protection slide 91, whereby the slide is automatically locked in its closed position until the last film sheet contained in cavity 90 has been introduced into a cassette in the manner to be described infra. All the other manipulations of the apparatus are carried out in full ambient light. An empty cassette 53 which is to be loaded with an unexposed film sheet is inserted in the space provided therefor in level M, namely in a manner such that the free opening of cavity 56 of the cassette is directed upward. The action of insertion of the cassette causes the locked status of light protection slide 116 (which slide is disposed beneath rotable disc 112) to be released. At the same time, light protection slide 57 of the cassette is coupled with light protection slide 116. Then the two light protection slides 57 and 116 can be manipulated in tandem, whereby the bottommost sheet of the film sheet stack in cavity 90 is separated from the stack and delivered into cassette 53. After the two light protection slides 57 and 116 are closed, cassette 53 (now loaded) can be withdrawn from level M. If the photographer desires to transfer an exposed film sheet from a cassette into a container 51, he must insert cassette 53 into level M in such a way that the free opening of cavity 56 of the cassette is directed downward. He must also insert container 51 into the space provided therefor in bottom level N. The correct insertion of cassette 53 and container 51 causes light protection slide 270 which is disposed between them to be released and to be coupled with light protection slide 57 of the cassette as well as with light protection slide 70 of the container. When thereafter the three mutually coupled light protection slides are opened in the coupled state, the exposed film sheet falls from cassette 53 into container 51. After the three aforesaid light protection slides are closed, the film sheet in container 51 is protected against contact with light. The now-empty cassette 53 can then be flipped over and can be reloaded with an unexposed film sheet in the manner described supra.

It is evident from the preceding description that there are various combination possibilities of the different levels A-N which may be effected in order to assemble an apparatus which meets given requirements for handling light-sensitive sheet materials. Thus, e.g., it may be advantageous to combine the apparatus illustrated in FIGS. 1-33, which comprises levels A, B, and C, with the apparatus according to FIGS. 34-37, to form a single unit comprised of the five levels A to E. Another advantageous variant embodiment may be comprised of the three levels L, M, and N, according to FIG. 40, with a level A disposed on top of these for receiving a container 51, the cavity 52 of which container has its free opening directed downward, so that there is no need to introduce a stack of unexposed film sheets into the cavity of level L in a darkroom, but rather such introduction can be carried out in full ambient light.

Figure 41:
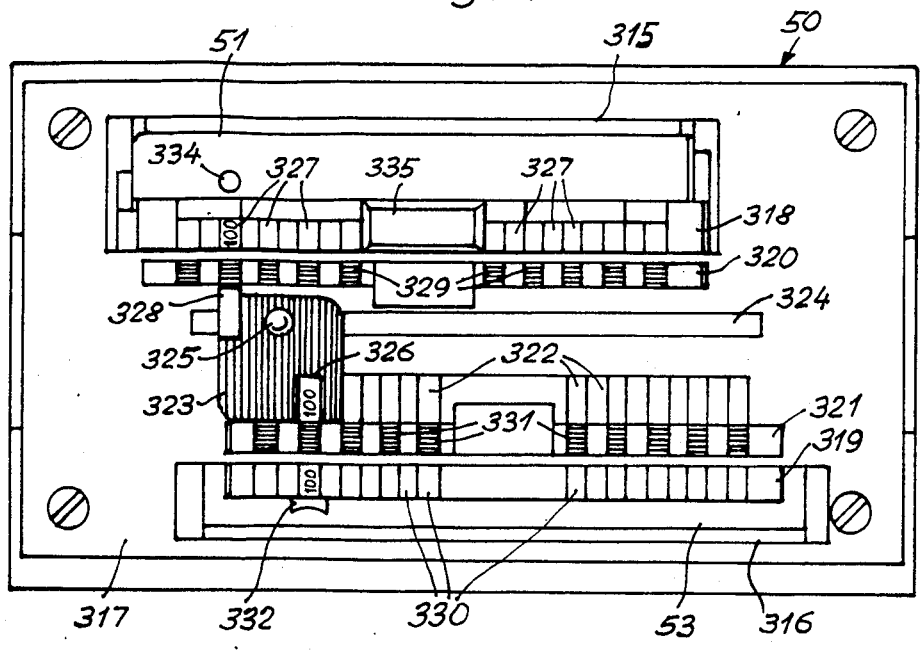
FIG. 41 is a front view of a different embodiment of a device for loading film cassettes for a professional-type photographic camera, wherewith means are provided for indicating the type of the film material being used at a given time.
Figure 42:
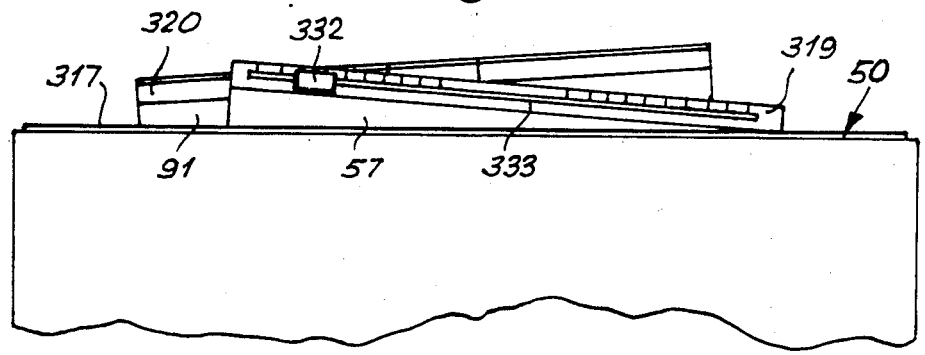
FIG. 42 is a partial bottom view of the device according to FIG. 41.

FIGS. 41 and 42 ilustrate an embodiment of an inventive apparatus for loading cassettes for a professional-style photographic camera with unexposed film sheets, which embodiment is similar to the embodiment described first supra (see particularly FIGS. 1-4). As in the said first-described embodiment, the apparatus according to FIGS. 41 and 42 comprises a housing 50 into which a separating device (not shown) is integrated, wherewith a container 51 may be slid into the upper part of the housing in drawer fashion, and a cassette 53 may be slid into the lower part of the housing in drawer fashion. The forward external surface 317 of housing 50, which is furnished with openings 315 and 316 through which container 51 and cassette 53 respectively may be slid, is flat. All the light protection slides are manipulable from the same exterior surface 317. These slides are namely those of container 51 and cassette 53, as well as the two light protection slides on the entrance opening of the accumulation space of the separating device, and on the delivery opening of the separation device, respectively. The light protection slides themselves are not shown in FIG. 41, but knurled strips 318, 319, 320, and 321 are shown, which strips are attached to the light protection slides, and each such strip extends over the entire width of the respective light protection slide. The bottom view according to FIG. 42 shows light protection slide 57 of cassette 53 and light protection slide 91 which slide 91 is associated with the accumulation space of the separating device. Light protection slide 57 hides (in FIG. 42) the light protection slide on the delivery opening of the separating device, which latter light protection slide runs parallel to light protection slide 57 and corresponds to light protection slide 116 in the first exemplary embodiment. Also, light protection slide 91 of the accumulation space of the separating device hides (in FIG. 42) the light protection slide of the container, which latter light protection slide is parallel to light protection slide 91 and corresponds to light protection slide 70 in the first exemplary embodiment.

A row of emulsion data fields 322 is disposed on the outer surface 317 of housing 50, between the two light protection slides 91 and 116 of the separating device, which row runs in the direction of the width dimension of the light protection slides. The purpose and significance of these fields will be stated hereinbelow. An indexing slide 323 is slidably mounted along the said row, guided there by means of a guide groove 324 and associated guide means (not shown). Brake or locking organs (also not shown) acted on by a spring serve to hold indexing slide 323 in a given position where set, so that it will not be unintentionally slid away. The brake or locking means can be loosened by means of a pushbutton 325 in order to be able to move the indexing slide into a different position. Slide 323 has a notch 326 which serves as an indicating device; one of the emulsion data fields 322 is visible through the notch. It is seen that indexing slide 323 can be adjusted as desired with respect to any of the emulsion data fields 322.

Knurled strip 318 of the light protection slide of container 51 is provided with a second row of emulsion data fields 327 which fields are disposed basically the same as data fields 322. A second indicating device 328 is provided on indexing slide 323, which device 328 is directed toward one of the emulsion data fields 327, whereby in each position of the indexing slide the emulsion data fields 322 and 327 indicated by notch 326 and indicating device 328 mutually correspond. Between indicating device 328 and the knurled strip 318 which bears the emulsion data fields 327, knurled strip 320 of light protection slide 91 is disposed. In order to enable perceptively clear coordination of the indicating device 328 and the emulsion data fields 327, the knurled strip 320 disposed between device 328 and fields 327 is provided with auxiliary markings 329 coordinated with emulsion data fields 327, which allows visual bridging of the intermediate space between indicating device 328 and the emulsion data field 327 opposite the device.

A third row of emulsion data fields 330 is disposed on knurled strip 319 of light protection slide 57 of cassette 53, which row is basically the same as the row of emulsion data fields 322. Notch 326 in indexing slide 323 is directed toward the corresponding emulsion data field 330, in each case, as well as toward one of the emulsion data fields 322. Between indexing slide 323 and the knurled strip 319 bearing emulsion data fields 330, a knurled strip 321 is disposed. The latter is provided with a row of auxiliary markings 321 which are associated with the individual emulsion data fields 330 and which allow visual bridging of the individual intermediate spaces between the notch 326 of indexing slide 323 (which notch serves as an indicating device) and, in each case, the given oppositely lying emulsion data field 330. A small marker slide 332 is slidably disposed on the underside (FIG. 41) of knurled strip 319 of light protection slide 57 of cassette 53, with the aid of a guide groove (FIG. 42). Marker slide 332 can be set to refer to a given one of the emulsion data fields 330, in order to mark the noted field 330 which lies opposite the notch 326 of index slide 323 at a given time. Marker slide 332 is held in place in its setting, so that it will not be slid away unintentionally, the holding being by means of a brake organ acted upon by a spring.

The purpose and manner of use of the refinement described with reference to FIGS. 41 and 42 are as follows:

The photographic film sheets supplied in container 51 all have a light-sensitive emulsion which has specific characterizing data, e.g. sensitivity, black-white or color, negative or positive, color temperature, etc. The emulsion data fields 322, 327, and 330 correspond to the various emulsion types commonly used, and are marked accordingly, e.g. in terms of numbers, colors, and/or code numbers. The emulsion data field 327 corresponding to the emulsion of the film sheets in the container is indicated in a suitable fashion, e.g., by means of a label dot 334 adhesively attached to container 51. In an additional field 335, the manufacturer of the film sheets can be indicated. Advantageously, the indication of the emulsion data field 327, e.g., by means of a label dot 334, is accomplished each time the container 51 is filled, whether this occurs in the film sheet factory or in the photographer's darkroom. After container 51 is inserted in housing 50, with the light protection slides in closed position, the photographer sets the indexing slide 323 to a position such that its upper indicating device 328 is opposite the emulsion data field 327 marked on the knurled strip 318 of the light protection slide of the container, as shown in FIG. 41. Then the emulsion data field 322 corresponding to the marked emulsion data field 327 comes to lie in notch 326 of indexing slide 323. In this way the emulsion data of the film sheets contained in container 51 are transferred to housing 50 and fixed there. The film sheets from container 51 can be transferred into the accumulation space of the separating device by simultaneous pulling and then subsequent back-sliding of the light protection slides provided with knurled strips 318 and 320; this sequence of manipulations is the same as described earlier in connection with the first exemplary embodiment. If thereafter the emptied container 51 is removed from housing 50, the emulsion data of the film sheets transferred to the accumulation space of the separating device remain stored in the notch 326 of the indexing slide 323.

If at this time or later the photographer wishes to load individual film sheets into photographic cassettes 53, he slides the cassettes one after the other into the space provided therefor in housing 50, and in each instance brings the marker slide 332 on knurled strip 319 of the light protection slide 57 of each cassette into position opposite notch 326 in indexing slide 323. In this way the emulsion data field 330 to which the emulsion data of the film sheets located in the separating device correspond is indicated. Finally, the photographer transfers a single film sheet into cassette 53, by simultaneous pulling and subsequent back-sliding of the light protection slide furnished with knurled strips 319 and 321. The photographer can check, by referring to the cassette 53 removed from housing 50, which emulsion the film sheet loaded into the cassette has, since the marker slide 332 is located opposite the same emulsion data field 330 which applies to the emulsion data of the film sheet.

Thus, a practical means has been afforded to transfer in error free fashion the emulsion data of the film sheets (which film sheets are being manipulated by the herein-described apparatus) from container 51 to cassettes 53, and to maintain or store the data on the cassette by means of marker slide 332 and the emulsion data field 330 opposite the slide in a given case.

The rows of emulsion data fields 322, 327, and 330 may advantageously also contain blanks, i.e., empty fields which the photographer can write on individually. The rows of emulsion data fields may be comprised of preprinted adhesive strips which can be changed if need be, e.g., if new photographic materials with hitherto uncustomary emulsion data come on the market.

In all the described and illustrated exemplary embodiments, the sheets of the photographic sheet material being handled lie horizontal, and their gravity transport within the apparatuses takes place in the vertical direction, i.e., in a direction perpendicular to the plane of the individual sheets. However, it is quite possible to configure the apparatus such that the direction of movement of the sheets is at an angle to the plane of the individual sheets, the angle being in the range of 30–90 degrees, preferably 75–90 degrees.

In the described exemplary embodiments of apparatuses with a separating device 55, the separating organ for the single sheets in a stack which organ comprises a component of the separating device is in the form of a rotatable disc 112 the rotational axis 114 of which runs through the middle of the perforation 115 of the disc 112. However, it is also possible to eccentrically dispose the rotation axis of the disc serving as a separating organ, in order to thereby increase the drive lever arm and reduce the required drive force. Alternatively to the disc 112 serving as a separating organ being rotatable, it can, e.g., be slidable back and forth in the direction of a diagonal of its perforation 115. In this case, the delivery opening 125 is not rotated with respect to the horizontal cross section of cavity 90 but is displaced with respect thereto in the sliding direction of disc 112.

I claim:

1. An apparatus for handling light-sensitive photographic sheet material in ambient light, comprising a separating device for separating individual sheets from a stack comprising a plurality of sheets of the same shape and size, and for transferring the separated sheets into a cassette intended for mounting on a photographic camera, or into a feed inlet of a developing apparatus, wherewith the separating device has an entrance opening for feeding sheet material and a delivery opening for delivering each individual sheet, and is provided with a movable separating organ for separating individual sheets from stack, said separating organ being disposed between said entrance opening and said delivery opening, and the separating device also is provided with connecting means, which connecting means allow the delivery opening of the separating device to be joined to the cassette or to a connecting piece on the feed inlet of the developing apparatus, said joining being releasable and being protected ambient light; characterized in that the separating device (55) has an accumulation space (90) for a stack of the sheet material, between the entrance opening of said separating device and the separating organ (112); further in that the entrance opening of the accumulating space (90) of the separating device (55) is provided with a closure organ (91) which is movable into a closed position which closes off the entrance opening in light-tight fashion, and into an open position which completely exposes the entrance opening; further in that support surfaces (150, 151) for supporting the edge parts of the instantaneously bottommost sheet of the stack are provided in the separating organ (112) of the separating device (55); further in that the separating device (55 comprises hold-down organs (155) which extend into the accumulation space (90), for pressing the stack against the support surfaces (150, 151); further in that each of the hold-down organs (155) is movable from its pressing position into an inactive position in which it is disposed outside the accumulation space (90), in order to enable the stack to be inserted into the accumulation space; and in that drive means (157–174) are provided to move the hold-down organs (155) into their respective pressure positions and into their respective inactive positions, which drive means are controllable by the closure organ (91) associated with the entrance opening of the accumulation space (90), such that each of the hold-down organs (155) is automatically brought into its inactive position when the closure organ (91) is moved into its open position, and when the closure organ (91) is moved into its closed position each said hold-down organ is automatically moved into its pressure position.

2. An apparatus according to claim 1; characterized in that the entry opening, the cross section of the accumulation space (90), and the delivery opening (125), of the separating device (55) are all adjusted in shape and size to the main surface dimensions of an individual sheet of the stack, and the sheet material is movable under the action of gravity through the separating device, from the entry opening of the accumulation space (90) to the delivery opening (125), in a direction of such movement which forms an angle in the range of 30–90 degrees, preferably 75–90 degrees, with the plane of the individual sheets.

3. An apparatus according to claim 1 characterized in that the separating device (55) comprises at least one control lever (182) swingable around an axle (157), wherewith one free end of which lever (182) serves as a spring-loaded (184) feeler finger (183) intended to rest against the instantaneously topmost sheet of the stack resting in the accumulation space (90) and to sense the height of the stack or the absence of any sheets in the accumulation space; and further in that at least one locking organ (190) is present which is movable into and out of an active position of said locking organ, which organ (190) when in its active position serves to lock the closure organ (91) associated with the entry opening of the accumulation space (90) in its closed position, and which organ (190) can be out of its active position by means of a control lever (182) in order to enable the closure organ (91) at the entry opening of the accumulation space (90) to be opened, when the feeler finger (183) determines that there are no sheets in the accumulation space (90).

4. An apparatus according to claim 3; characterized in that the locking organ (190) is movable into its active position under the action of gravity, when the closure organ (91) associated with the entry opening of the accumulation space (90) is in its closed position and the separating device (55) is oriented in space such that the accumulation space (90) is disposed above the delivery opening (125); and in that when the separating device (55) is oppositely oriented in space to its orientation when the said accumulation space is disposed above said delivery opening the locking organ (190) is movable out of its active position, said movement being under the action of gravity and the purpose of said movement being to enable to be opened the closure organ (91) disposed at the entry opening of the accumulation space (90), in order to remove the entire stack from the accumulation space (90) of the separating device.

5. An apparatus according to claim 1 characterized in that at least one container (51) for a stack of the photographic sheet material is present which has a light-tight closed, but openable, cavity (52) adjusted in shape and size to the lateral surface measurements of an individual sheet of the stack; and further in that connecting means (50) are present which allow the container (51) to be connected to the separating device (55) in a releasable and light-tight manner, such that the cavity (52) of the container (51) matchingly communicates with matching dimensions with the entry opening of the accumulation space (90) of the separating device (55), in order to enable passage of sheet material from the container (51) into the accumulation space (90) of the separating device.

6. An apparatus according to claim 5; characterized in that the closure organ at the entry opening of the accumulation space (90) of the separating device (55) is a light protection slide (91), and that a locking organ (99) is provided which locks slide (91) whenever the latter is in its closed position, said locking being effected as long as the container (51) is not in installed position adjacent to the said entry opening of the accumulation space (90).

7. An apparatus according to claim 6; characterized in that the cavity (52) of container (51) is also provided with a light protection slide (70), which slide (70) is movable into a closed position which closes off cavity (52) in lighttight fashion, and into an open position which completely exposes cavity (52); and in that the two light protection slides (91 and 70) associated with the entry opening of the accumulation space (90) of the separating device (55) and with the cavity (52) of the container (51) comprise coupling organs (92–95) which are mutually adapted to engage each other and which automatically come into coupling engagement each time the container (51) is coupled to the separating device (55), so that if one then moves the said two light protection slides (91 and 70) they must be moved simultaneously and in the same direction.

8. An apparatus according to claim 1 characterized in that a light protection slide (116) is associated with the delivery opening (125) of the separating device (55), which slide (116) is movable into a closed position which closes off said delivery opening (125) in light-tight fashion, and into an open position which completely exposes said delivery opening (125); and in that drive means (130–146) are provided to manipulate the separating organ (112) for single sheets, which organ (112) is a component of the separating device (55), which drive means are controllable via the light protection slide (116) associated with the delivery opening (125), the control being such that each time said light protection slide (116) is opened it causes the separating organ (112) for single sheets to be actuated to deliver a single sheet of the sheet material, and each time the said light protection slide (116) is closed it causes the said separating organ (112) to be moved back to its initial position.

9. An apparatus according to claim 8; characterized in that a locking organ (210) is provided which locks the light protection slide (116) (associated with the delivery opening (125) of the separating device (55)) in place whenever said slide (116) is in its closed position, said locking being effected as long as no cassette (53) and no connecting piece of a developing apparatus is in position adjacent to the delivery opening (125).

10. An apparatus according to claim 8; characterized in that a cavity (56) of cassette (53) or a pass-through opening of the connecting piece of the developing apparatus is adjusted in shape and size to the lateral surface dimensions of an individual sheet of the sheet material and is provided with a light protection slide (57) which slide (57) is movable into a closed position whereby the cavity (56) or the pass-through opening is closed off in light-tight fashion, and into an open position whereby the cavity (56) or the pass-through opening is completely exposed; and in that the two light protection slides (116, 57) associated with the delivery opening (125) of the separating device (55) and the cavity (56) of the cassette (53), respectively, or associated with said delivery opening and the pass-through opening of the connecting piece, have coupling organs which are mutually adapted to engage each other, which organs come into coupling engagement with each other each time the cassette (53) or the connecting piece is connected to the delivery opening (125) of the separating device (55), so that then in order to move the said two light protection slides (116, 57) one must do so simultaneously and in the same direction.

11. An apparatus according of claim 8; characterized in that the separating organ (112) for single sheets is a flat disc having thickness approximately the same as the thickness of a single sheet of the stack and having a perforation (115) for receiving and accommodating the instantaneously bottommost sheet which is to be separated from the stack, which separating organ (112) is displaceable in order to separate the bottommost sheet from the stack and in order to transfer said sheet thus separated into the delivery opening (125) of the separating device (55); further in that the perforation (115) of the separating organ (112) generally matches, in shape and size, the accumulation space (90) of the separating device (55), considered in the pass-through direction; and in that the light protection slide (116), which slide (116) is associated with the delivery opening (125) of the separating device (55) and immediately adjoins the lower side of the separating organ (112) which side faces away from the accumulation space (90), is slidably mounted and in its closed position completely closes off both the delivery opening (125) and the perforation (115) of the separating organ (112), in light-tight fashion, and at the same time said slide (116) forms a support for the instantaneously bottommost sheet of the stack disposed in the accumulation space (90).

12. An apparatus according to claim 3; characterized in that the control lever (182) which bears the feeler finger (183) is also provided with a locking dog, locking cam, or the like (183) which comes into engagement with a detent (194) on light protection slide (116) (which slide (116) is associated with the delivery open-ing (125) when there are no sheets in the accumulation space (90) of the separating device (55) and when said slide (116) occupies its closed position, whereby said slide (116) is locked in place in its said closed position by means of the locking dog (183) and the detent (194) on said slide (116).

13. An apparatus according to claim 6; characterized in that a back-sliding-prevention organ (105; 201) is associated with at least one of the two light protection slides (91, 116) of the separating device (55), which prevention organ prevents the respective light protection slide element (91; 116) from reversing its direction of movement when said slide (91; 116) is being opened or closed, as long as said slide is not completely moved into its open or closed position.

14. An apparatus according to claim 8; characterized in that a locking organ (210) is associated with the light protection slide (116) of the delivery opening (125) of the separating device (55), which locking organ (210) is acted on by a control member (114) which is actuatable by a cassette (53) which is connected to the delivery opening (125) of the separating device (55), such that after completion of a single opening and closing cycle of the light protection slide (116) which slide (116) is associated with the delivery opening (125) the locking organ (210) locks the slide (116) of the delivery opening (125) in place in its closed position.

15. An apparatus according to claim 7; characterized in that the separating device (55) is integrated into a housing (50) into one exterior side of which the container (51) and the cassette (53) are both slidable in the manner of drawers; and in that the light protection slides (91, 116) of the separating device (55) and the light protection slides (70, 57) of the container (51) and the cassette (53) respectively, are manipulable from the said exterior side of the housing (50).

16. An apparatus according to claim 15; characterized in that the housing is comprised of plurality of housing component structures (A, B, C) which are assembled sandwich like in superposed layers.

17. An apparatus according to claim 1; characterized in that the interior boundary surfaces of the accumulation space and/or of the entry opening and/or of the separating device (55) are provided with grooves (90A) which run generally in the direction of fall of the sheets of the stack.

18. An apparatus according to claim 5; characterized in that a combining piece (250; 300) is provided which enables connection, in sandwich-like and light-tight fashion, whereby a cassette (53) separated from the delivery opening (125) of the separating device (55) is interconnected with a container (51) separated from the entry opening of the accumulation space (90) of the separation device (55), or whereby such a cassette (53) is interconnected with a connecting piece (291) on the feed inlet of a developing apparatus, said interconnection thus enabled being such that the cavity (56) of the cassette (53) and the cavity (52) of the container (51) face each other in their imaginary surfaces transverse to the passthrough direction, or said cavity (56) and a pass-through opening of the connecting piece (291) face each other in their imaginary surfaces transverse to the pass-through direction and match each other in certain dimensions transverse to the pass-through direction; and further in that the combining piece (250) has an opening (253, 254; 253, 301) extending through it in the pass-through direction which is basically adapted in shape and size in its dimensions transverse to the passthrough direction to the free openings of the cavity (56) of the cassette (53), whereby a sheet from the cassette (53) can be transferred under the action of gravity into the container (51) and/or into the connecting piece (291)

19. An apparatus according to claim 18; characterized in that the cavity (56) of the cassette (53) and the cavity of the container (51), or the said cavity (56) and the passthrough opening of the connecting piece (291) are each provided with a light protection slide (57, 70), respectively, which slide is movable into a closed position whereby the respective cavity or the pass-through opening is closed off in light-tight fashion, and into an open position whereby the respective cavity or the pass-through opening is completely exposed; and in that coupling organs (271, 272, 119, etc.) are present whereby the light protection slide (57) of the cassette (53) is automatically couplable to the light protection slide (70) of the container (51) or of the connecting piece, when the cassette and the container, or the cassette and the connecting piece, are joined to the combining piece (250; 300), so that then in order to move the said two coupled light protection slides (57, 70) one must do so simultaneously and in the same direction.

20. An apparatus according to claim 18; characterized in that the cavities (56, 52) of the cassette (53) and of the container (51), as well as the pass-through opening (253, 254; 253, 301) of the combining piece (250; 300), and possibly also the connecting piece (294) are each provided with a light protection slide (57, 70, 270, 302) which slide is movable into a closed position whereby the respective cavity or pass-through opening is closed off in light-tight fashion, and into an open position whereby the respective cavity or pass-through opening is completely exposed; and in that coupling organs (94, 95, 58, 119, 271-273; 58, 119, 303, 304) are present by means of which the light protection slide (270, 302) of the pass-through opening of the combining piece can be coupled automatically to the light protection slide (57) of the cassette (53) as well as possibly to the light protection slide (70) of the container (51) or possibly to the light protection slide (70) of the connecting piece, when the cassette (53) as well as possibly the container or possibly the connecting piece are connected to the combining piece (250; 300), so that then in order to move the said two coupled light protection slides one must do so simultaneously and in the same direction.

21. An apparatus according to claim 20; characterized in that at least one back-sliding prevention organ (275) is associated with the light protection slide (270; 302) of the pass-through opening (253, 254; 253, 301) of the combining piece (250; 300), which prevention organ prevents the light protection slide from reversing its direction of movement when said slide (91; 116) is being opened or closed, as long as said slide is not completely moved into its open or closed position.

22. An apparatus according to claim 18; characterized in that the combining piece (250; 300) is a housing into which the cassette (53) and possibly the container (51) are slidable in the manner of drawers.

23. An apparatus accordin to claim 15; characterized in that the combining piece is a part of the housing containing the separating device, and the latter is of such a configuration that the container (51) and the cassette (53) are slidable into it in the manner of drawers, wherewith the cassette comes to lie above the container.

24. An apparatus according to claim 1; characterized in that the separating device (55) is provided with at least one labeling arrangement (225) for applying labels onto at least one border region of the instantaneously bottommost sheet of the stack lying in the accumulation space (90) of the separating device (55), wherewith the labeling arrangement can be automatically actuated by the separating organ (112) for single, sheets which organ (112) is a component of the separating device (55), each time said separating organ (112) is actuated.

25. An apparatus according to claim 24; characterized in that the labeling arrangement (225) comprises a radiation source (230) and at least on labeling mask (229) which is penetrable by the generated radiation to produce photographic labels on the instantaneously bottommost sheet of the stack.

26. An apparatus according to claim 11; characterized in that the drive means (130-146) for actuating the separating organ (112) for single sheets, which organ (112) is a component of the separating device (55), for each separation and delivery operation of the separating organ (112) first undergo an excursion which exceeds that required for the separation and then execute a smaller reverse movement, for the purpose of eliminating any play between the cut edge of the sheet along which edge the labeling is to be applied and the neighboring boundary of the perforation (115) of the separating organ (112).

27. An apparatus according to claim 15; characterized in that a first row of emulsion data fields (322) extending in the direction of the breadth dimension of the light protection slide and at least one indexing slide (323) adjustable along said row are disposed on the exterior surface (317) of the housing (50) at which surface the light protection slides (70, 91, 116, 57) are manipulable, said emulsion data fields being disposed namely between the light protection slides (91, 116) of the separating device (55), wherewith the indexing slide (323) can be lined up with any given emulsion data field (322) in order to record and visually indicate the relevant emulsion data; further in that the light protection slides (70, 57) of the container (51) and of the cassette (53) are each provided with a knurled strip (318; 319) extending over the width of the said light protection slide, wherewith a similar second or third row of emulsion data fields (327 or 330) is present on the knurled strip; and in that the indexing slide (323) has two indicating devices (328, 326) each of which cooperates with the second or third row of emulsion data fields (327 or 330), such that, when the light protection slides are closed, for each setting of the indexing slide (323) with respect to one of the emulsion data fields (322) of the first row the indicating devices (328, 326) indicate the corresponding emulsion data fields (327, 330) of the first and second rows of emulsion data fields applied on the knurled strips (318, 319 respectively.

28. An apparatus according to claim 27; characterized in that the light protection slides (91, 116) of the separating device (55) are also each provided with with a knurled strip (320, 321) extending over the width of the said light protection slide, which strip bears a row of auxiliary markings (329 or 331) which are aligned with the emulsion data fields (327 or 330) of the knurled strip (318) of the light protection slide (70) of the container (51) and of the knurled strip (319) of the light protection slide (57) of the cassette (53), such that the auxiliary markings (329, 331) serve to visually bridge the intermediate spaces between the indicating devices (328, 326) of the indexing slide (323) and the targeted emulsion data fields (327, 330) on the knurled strips (318, 319) of the light protection slides (70, 57) of the container (51) and of the cassette (53) respectively.

29. An apparatus according to claim 27; characterized in that a marking slide (332) is disposed on the knurled strip (319) of the light protection slide (57) of the cassette (53), which marking slide (332) is adjustable along the row of emulsion data fields (330) present on said strip (319), wherewith said marking slide (332) can be aligned with any given one of said emulsion data fields (330) in order to record and visually indicate said field (330).

* * * * *